(12) United States Patent
Unnikrishnan

(10) Patent No.: US 12,461,928 B2
(45) Date of Patent: Nov. 4, 2025

(54) SYSTEMS AND METHODS FOR ENCODING AND SEARCHING SCENARIO INFORMATION

(71) Applicant: Lyft, Inc., San Francisco, CA (US)

(72) Inventor: Ranjith Unnikrishnan, Fremont, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/745,863

(22) Filed: Jun. 17, 2024

(65) Prior Publication Data

US 2024/0419675 A1    Dec. 19, 2024

Related U.S. Application Data

(63) Continuation of application No. 16/917,336, filed on Jun. 30, 2020, now Pat. No. 12,056,136.

(51) Int. Cl.
*G06F 16/2458* (2019.01)
*G06F 16/248* (2019.01)

(52) U.S. Cl.
CPC ........ *G06F 16/2462* (2019.01); *G06F 16/248* (2019.01)

(58) Field of Classification Search
CPC .... G06F 16/2462; G06F 16/248; G06F 16/53; G06F 16/50
USPC ......................................................... 707/772
See application file for complete search history.

(56) References Cited

U.S. PATENT DOCUMENTS

| | | | |
|---|---|---|---|
| 8,457,827 B1 | 6/2013 | Ferguson et al. | |
| 9,953,538 B1 | 4/2018 | Matthiesen et al. | |
| 10,479,356 B1* | 11/2019 | Haque | B60W 30/09 |
| 10,625,748 B1* | 4/2020 | Dong | B60W 60/00272 |
| 11,003,856 B2 | 5/2021 | Kiros et al. | |
| 11,919,545 B2* | 3/2024 | Zaremba | G06V 20/58 |
| 2005/0108630 A1 | 5/2005 | Wasson et al. | |
| 2009/0088918 A1 | 4/2009 | Takenaka et al. | |
| 2010/0228419 A1 | 9/2010 | Lee et al. | |
| 2016/0050264 A1 | 2/2016 | Breed et al. | |
| 2018/0032558 A1 | 2/2018 | Oliner | |

(Continued)

OTHER PUBLICATIONS

Bansal, Mayank, et al., "ChauffeurNet: Learning to Drive by Imitating the Best and Synthesizing the Worst", Robotics: Science and Systems, Google Brain & Waymo, 2019, 10 pages.

(Continued)

*Primary Examiner* — Michael Pham
(74) *Attorney, Agent, or Firm* — Sheppard Mullin Richter & Hampton LLP

(57) ABSTRACT

Systems, methods, and non-transitory computer-readable media can receive a query specifying at least one example scenario. At least one image representation of the at least one example scenario can be encoded based on the query to produce at least one encoded representation. An embedding of the at least one representation of the at least one example scenario can be generated based on the at least one encoded representation. At least one scenario that is similar to the at least one example scenario can be identified based at least in part on the embedding of the at least one representation of the at least one example scenario and an embedding representing the at least one scenario. Information describing the at least one identified scenario can be provided in response to the query.

20 Claims, 17 Drawing Sheets

(56) References Cited

U.S. PATENT DOCUMENTS

| | | |
|---|---|---|
| 2019/0019329 A1 | 1/2019 | Eyler et al. |
| 2020/0189579 A1 | 6/2020 | Haque et al. |
| 2020/0219264 A1 | 7/2020 | Brunner et al. |
| 2020/0353943 A1* | 11/2020 | Siddiqui ............... G06N 3/045 |
| 2023/0152120 A1 | 5/2023 | Ikeda et al. |

OTHER PUBLICATIONS

Casas, Sergio, et al., IntentNet: Learning to Predict Intention from Raw Sensor Data, UberATG, 2018, 2nd Conference on Robot Learning (CoRL 2018), 10 pages.

Djuric, Nemanja, et al., Short-Term Motion Prediction of Traffic Actors for Autonomous Driving Using Deep Convolutional Networks, UberATG, 2018, 18 pages.

Lee, Donghan, et al., "Convolution Neural Network-Based Lane Change Intention Prediction of Surrounding Vehicles for ACC", Department of Mechanical Engineering, University of California, 2017, 6 pages.

Luo, Wenjie, et al., "Fast and Furious: Real Time End-to-End 3D Detection, Tracking and Motion Forecasting with a Single Convolutional Net", IEEE Xplore, UberATG, 2018, 9 pages.

Phillips, Derek J., et al., "Generalizable Intention Prediction of Human Drivers at Intersections", The Department of Aeronautics and Astronautics and the Department of Computer Science, Stanford University, 2017, 6 pages.

Zeng, Wenyuan, et al., "End-to-End Interpretable Neural Motion Planner", UberATG, 2019, 10 pages.

Zhao, Tianyang, et al., Multi-Agent Tensor Fusion for Contextual Trajectory Prediction, ISEE.AI, CVPR, 2019, 2 pages.

* cited by examiner

620

```
┌─────────────────────────────────────────────────┐
│ Acquire an anchor representation comprising a   │
│ first encoded image representing a scenario     │
│                      622                        │
└─────────────────────────────────────────────────┘
                         │
                         ▼
┌─────────────────────────────────────────────────┐
│ Acquire a positive representation comprising a  │
│ second encoded image representing a scenario    │
│ that has a threshold level of similarity        │
│ to the anchor representation                    │
│                      624                        │
└─────────────────────────────────────────────────┘
                         │
                         ▼
┌─────────────────────────────────────────────────┐
│ Acquire a negative representation comprising a  │
│ third encoded image representing a scenario     │
│ that does not have the threshold level of       │
│ similarity to the anchor representation         │
│                      626                        │
└─────────────────────────────────────────────────┘
                         │
                         ▼
┌─────────────────────────────────────────────────┐
│ Train a machine learning model with the anchor  │
│ representation, the positive representation,    │
│ and the negative representation                 │
│                      628                        │
└─────────────────────────────────────────────────┘
```

FIGURE 6B

SYSTEMS AND METHODS FOR ENCODING AND SEARCHING SCENARIO INFORMATION

This application is a continuation of U.S. patent application Ser. No. 16/917,336, filed on Jun. 30, 2020, and entitled "SYSTEMS AND METHODS FOR ENCODING AND SEARCHING SCENARIO INFORMATION", which is incorporated in its entirety herein by reference.

FIELD OF THE INVENTION

The present technology relates to the field of vehicles. More particularly, the present technology relates to systems, apparatus, and methods for encoding and searching scenario information.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive a query specifying at least one example scenario. At least one image representation of the at least one example scenario can be encoded based on the query to produce at least one encoded representation. An embedding of the at least one representation of the at least one example scenario can be generated based on the at least one encoded representation. At least one scenario that is similar to the at least one example scenario can be identified based at least in part on the embedding of the at least one representation of the at least one example scenario and an embedding representing the at least one scenario. Information describing the at least one identified scenario can be provided in response to the query.

In an embodiment, the embedding of the at least one representation of the at least one example scenario can be generated within a vector space, and the embedding representing the at least one scenario can be included within the vector space.

In an embodiment, the identifying the at least one scenario can further comprise determining that a threshold distance within the vector space between the embedding of the at least one representation of the at least one scenario and the embedding representing the at least one example scenario is satisfied.

In an embodiment, the identifying the at least one scenario can further comprise determining that the threshold distance between the embedding representing the at least one scenario and the embedding representing the at least one example scenario is less than a threshold distance between the embedding representing the at least one example scenario and an additional embedding representing an additional scenario.

In an embodiment, the query can identify the at least one example scenario based on an identifier that references image data captured by one or more vehicles and a timestamp identifying particular image data that represents the at least one example scenario.

In an embodiment, the image data is based on multiple images associated with the at least one example scenario that are captured by the one or more vehicles over a period of time.

In an embodiment, the image data can be a raster of the at least one example scenario that includes at least one trajectory associated with the one or more vehicles, one or more respective trajectories associated with one or more agents, and map data.

In an embodiment, the one or more agents can be distinguished based on pre-defined colors and the one or more respective trajectories associated with the one or more agents are represented based on different grades of the pre-defined colors.

In an embodiment, the at least one trajectory and the one or more respective trajectories are based on the period of time.

In an embodiment, a machine learning model can be trained with an anchor representation comprising a first encoded image representing a scenario, a positive representation comprising a second encoded image representing a scenario that has a threshold level of similarity to the anchor representation, and a negative representation comprising a third encoded image representation of a scenario that does not have the threshold level of similarity to the anchor representation.

In an embodiment, subsequent to training the machine learning model, the first encoded image representing the scenario can be arranged within a vector space that includes the second encoded image and the third encoded image. A first threshold distance between the first encoded image and the second encoded image within the vector space can be less than a second threshold distance between the first encoded image and the third encoded image within the vector space.

Various embodiments of the present technology can include systems, methods, and non-transitory computer readable media configured to receive a search query including one or more high-level primitives. One or more low-level parameters describing behavior of at least one agent associated with at least one value that satisfies at least one annotation rule associated with the one or more high-level primitives can be determined. In response to determining that the at least one value satisfies the at least one annotation rule, one or more scenarios associated with the one or more low-level parameters that satisfy the at least one annotation rule can be identified by using the one or more high-level primitives included in the search query. Information describing the one or more identified scenarios in response to the search query can be provided.

In an embodiment, the at least one annotation rule can include at least one of a low-level parameter rule or a time-window rule.

In an embodiment, the one or more high-level primitives can be capable of being used to identify the one or more identified scenarios in lieu of including the low-level parameters in the search query.

In an embodiment, the search query can include at least a first keyword and a second keyword that are associated with the one or more high-level primitives. That the first keyword is associated with a first high-level primitive and the second keyword is associated with a second high-level primitive can be determined. An inner join or an outer join of the search query based on the first keyword and the second keyword can be performed. That the one or more identified scenarios satisfy the at least one annotation rule associated with the first and second keywords can be determined. The one or more identified scenarios that satisfy the at least one annotation rule associated with both the first keyword and the second keyword can be provided.

In an embodiment, a set of low-level parameters associated with an agent involved in a scenario can be determined. That the set of low-level parameters satisfy an annotation rule associated with at least one high-level primitive can be determined. The scenario can be associated with the at least one high-level primitive based upon the set of low-level parameters satisfying the at least one annotation rule.

In an embodiment, the set of low-level parameters can describe at least one spatial parameter and at least one temporal parameter of the agent.

In an embodiment, a new high-level primitive associated with a new annotation rule can be received. The new high-level primitive to a collection of the one or more high-level primitives can be added. That the set of low-level parameters satisfy the new annotation rule associated with the new high-level primitive can be determined. The at least one scenario can be associated with the new high-level primitive based upon satisfaction of the new one annotation rule.

In an embodiment, the search query can comprise at least one of a natural language query based on text descriptions associated with scenarios, a keyword query based on high-level primitives associated with the scenarios, or a structured query language (SQL) query.

In an embodiment, in response to determining that the at least one value satisfies the at least one annotation rule, the one or more high-level primitives can be utilized in the search query to search for the one or more identified scenarios in lieu of the search query including the one or more low-level parameters.

In an embodiment, one or more keywords associated with a scenario can be determined. The scenario in the catalog based on the one or more associated keywords can be indexed.

In an embodiment, an additional scenario associated with one or more low-level parameters can be received. That the one or more low-level parameters do not satisfy annotation rules associated with high-level primitives in the index can be determined. In response to the determining, an additional high-level primitive that identifies the one or more low-level parameters associated with the additional scenario can be generated.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 6A-6B illustrate example methods, according to embodiments of the present technology.

Figure 1A:
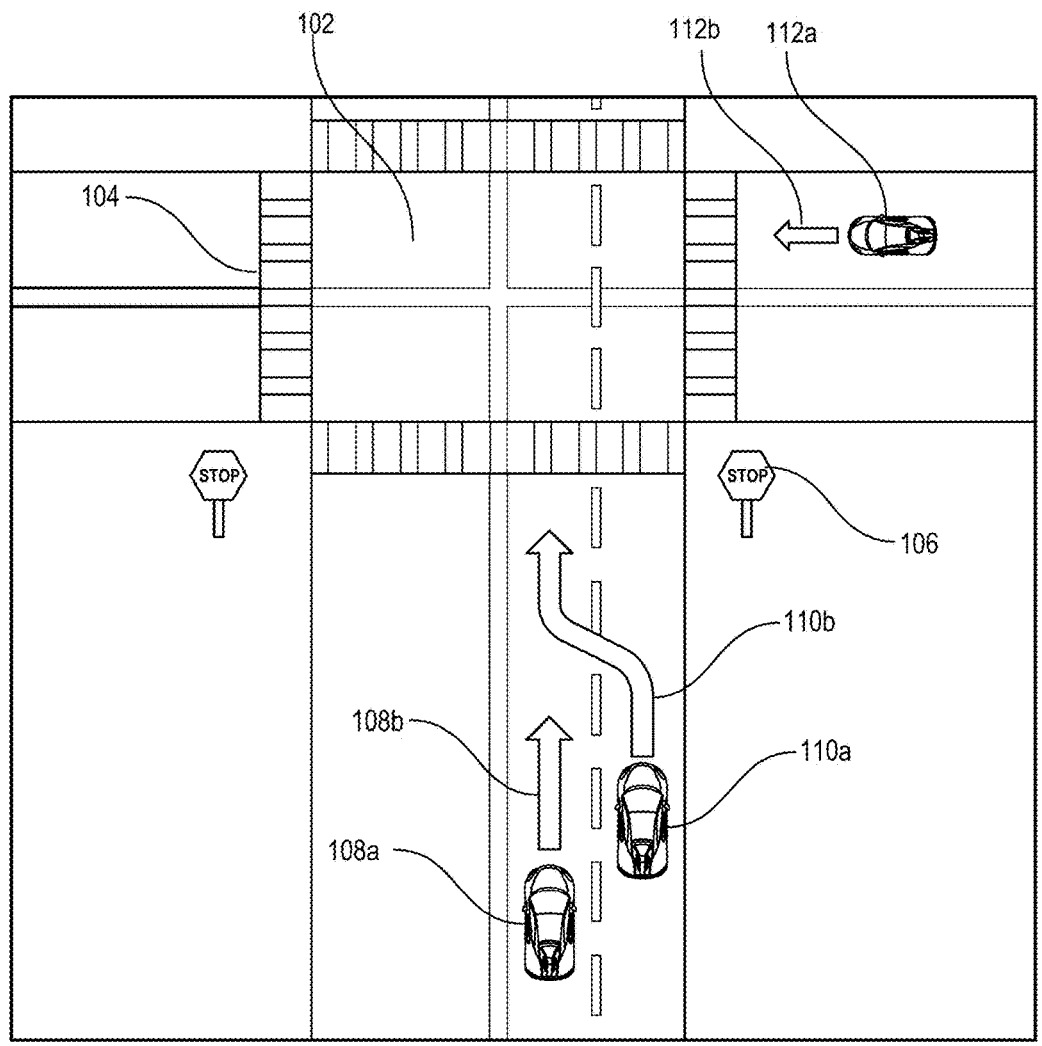
FIG. 1A illustrates challenges that may be experienced when attempting to retrieve information describing scenarios.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

Scenario Similarity Searching Using Embedded Scenario Encodings

A vehicle may experience a variety of scenarios as it navigates a given geographic location. These scenarios can be captured and represented based on sensor data captured by various sensors of the vehicle. The sensor data may include data captured by one or more sensors including optical cameras, LiDAR, radar, infrared cameras, and ultrasound equipment, to name some examples. Under conventional approaches, data (or information) describing such scenarios can be organized and searched based on a taxonomy that categorizes the scenario information within a hierarchical structure. For example, a set of scenarios can be grouped together based on the types of agents that are involved with those scenarios, such as "pedestrians", "cyclists", "vehicles", or the like. Scenarios included in a "vehicles" category can further be sub-categorized based on vehicle type, such as "sedans", "trucks", "motorcycles", or the like. As another example, the same set of scenarios can be grouped together based on context. For example, a context associated with a scenario can provide details describing the types of roads involved in the scenario, such as "intersection" or "highway". In this example, scenarios included in an "intersection" category can further be sub-categorized based on intersection type, such as "uncontrolled intersection" or "controlled intersection". Continuing with this example, scenarios can further be grouped into additional sub-categories based on the taxonomy, which can differentiate controlled intersections that include stop signs from controlled intersections that include traffic lights.

While grouping scenarios based on taxonomy is helpful for organizational purposes, retrieving scenario information based on this approach can be challenging for a number of reasons. For example, assume that a human searcher wants to obtain information describing a scenario that involves a pedestrian at a four-way intersection with stop signs. The searcher may want to retrieve such information to perform a computer-based simulation of a vehicle that virtually experiences the scenario, for example, for purposes of testing the vehicle's response to the scenario. Scenarios can be identified and included in a simulation suite or selection comprising the identified scenarios. In this example, before relevant scenarios can be obtained, the searcher needs to understand the taxonomy under which scenarios were categorized and sub-categorized. Based on the searcher's understanding of the taxonomy, the searcher can conduct a search for scenarios of interest based on a particular combination of categories and sub-categories. However, if the searcher is not fully familiar with the taxonomy, the searcher may inadvertently miss scenarios that may be of interest by overlooking relevant categories and sub-categories under which those scenarios are organized. Further, even if the searcher has full knowledge of the taxonomy, the searcher may still not be able to retrieve relevant scenarios if the scenarios were improperly categorized. As a result, the searcher may fail to include some potentially useful scenarios in the simulation suite. On the other hand, even when the scenarios are properly categorized and the searcher understands how scenarios are categorized based on the hierarchical structure, some of the scenarios may lack relevance for purposes of the simulation suite. For example, assume that the simulation suite is directed to improving a vehicle's response to children who are running across a four-way intersection with stop signs. In this example, inclusion of scenarios that involve adult pedestrians walking across the four-way intersection may increase the complexity of computer-based simulations without providing much insight into how a vehicle would respond when encountering scenarios involving children who are running across a four-way intersection. Thus, short of analyzing and hand-picking individual scenarios, the searcher may inadvertently include irrelevant scenario examples that prevent an accurate assessment of a vehicle's response to one or more particular scenarios. Accordingly, conventional approaches may produce computer-based simulation results that are inaccurate or incomplete. Additionally, conventional taxonomy structures for scenarios are rigid and fixed. If a new scenario is not fully represented by currently available categories and subcategories of scenarios, then conventional systems necessitate a need to create one. Unfortunately, this limitation of the conventional taxonomy structures puts undesirable burden on developers to define and manage the conventional taxonomy structures. This limitation of the conventional taxonomy structures also requires searchers to continuously update their understanding of the conventional taxonomy structures. Thus, an improved approach that indexes or maintains scenario data of different types of scenarios that negates the need for the developers and searchers to keep up with the taxonomy structure is desired.

FIG. 1A illustrates an example scenario 100 in which a searcher faces various shortcomings of the conventional approaches. The example scenario 100 can be a scenario for which the searcher wishes to discover similar scenarios to include in a simulation suite of computer-based simulations to test a vehicle's response to those scenarios. Assume that the searcher is interested in simulation cases where a vehicle 110a cuts in front of another vehicle 108a, as illustrated in the example scenario 100. The example scenario 100 illustrates three vehicles 108a, 110a, and 112a navigating toward an intersection 102. The intersection 102 has at least one crosswalk 104 and at least one stop sign 106 to control oncoming traffic. The vehicles 108a, 110a, and 112a navigate toward the intersection 102 based on their respective trajectories 108b, 110b, 112b. In this example, the searcher may be interested in similar scenarios that involve vehicles performing a cut-in trajectory similar to the cut-in trajectory 110b of the vehicle 110a relative to the trajectory 108b of the vehicle 108a. In this regard, the searcher may retrieve scenarios in a sub-category of scenarios which include a four-way intersection with stop signs. However, the searcher may inadvertently fail to retrieve additional scenarios of interest that occur at a four-way intersection with traffic lights, because these scenarios are included in a different sub-category which the searcher overlooked. As a result, any computer-based simulations involving scenarios that occur at four-way intersections may be inaccurate or incomplete. Accordingly, conventional approaches for accessing scenarios based on a taxonomy (or a hierarchical structure) alone can result in an incomplete retrieval of scenario examples that are needed for a particular application, such as a computer-based simulation to evaluate a vehicle's performance in response to those scenarios.

An improved approach in accordance with the present technology overcomes the foregoing and other disadvantages associated with conventional approaches. In various embodiments, a machine learning technique can be used to determine similar scenarios. For example, a model can be trained to generate embeddings in a low-dimension vector space based on images representing scenarios. For example, an embedding can be generated based on an encoded image of a given scenario that was encountered by a vehicle while navigating an environment. The encoded image may be a bird's-eye view (BEV) of the scenario and can be generated based on various sensor data, such as point clouds produced by LiDAR sensors of the vehicle. In this example, the encoded image can depict the environment in which the scenario occurred and one or more agents present within the environment. In some embodiments, the encoded image can further depict movement information (e.g., trajectories) of the one or more agents over a period of time. For example, an agent can be assigned a color and its trajectory can be depicted with varying grades of the assigned color. The encoded image can further include semantic map information including, but not limited to, roads and their intended directions of travel. The semantic map information can also be encoded with colors and color grading (or contrasts). For example, an intended direction of travel of a road from point A to point B can be encoded with a colored line and the reverse direction from point B to point A can be encoded with a different colored line. The encoded image can be a raster image (e.g., a bitmap image).

To identify similar scenarios, a search query can be provided from a searcher. The search query can be an image query, a non-image query, or a combination of both. With respect to the image query, in some embodiments, the image query can be a BEV image from which an encoded image is generated based on image processing and the generated encoded image can be used to perform a search for similar scenarios. In some embodiments, the image query can be selected from a catalogue of previously generated encoded images representing various scenarios. With respect to the non-image query, the non-image query can be a combination values that identifies one or more example scenarios with which to identify one or more similar scenarios. For example, the non-image query can be an SQL-like query. As another example, the non-image query can provide a mission identifier ("a mission ID") that identifies a video or a set of images and a timestamp that identifies a particular segment of the video or the set of images. Based on the mission identifier and the video or the set of images, an encoded image can be generated. In some instances, the non-image query can additionally specify other search parameters including parameters specifying temporal aspects and spatial aspects that include movements of an ego (e.g., an autonomous or semi-autonomous vehicle) or various agents. An encoded image can be generated based on such non-image query. Once an encoded image representing a scenario is acquired, the encoded image can be provided to the model to generate an embedding for the example scenario. The embedding representing the scenario can be compared with embeddings representing other scenarios to identify similar scenarios. For example, scenarios associated with embeddings that are within a threshold distance of the embedding associated with the example scenario can be identified as similar scenarios. For example, distances can be determined based on cosine similarity. Other approaches for determining similar scenarios based on embeddings can be applied, including nearest-neighbor search algorithms. The improved approach of the present technology allows a searcher to easily identify similar scenarios without requiring the searcher to sift through scenarios categorized based on some hierarchical structure, where the sifting methodology or the hierarchical structure may be flawed. Additionally, the searcher may advantageously refine similarity criteria to identify more or fewer scenarios based on embedding proximity.

Figure 1B:
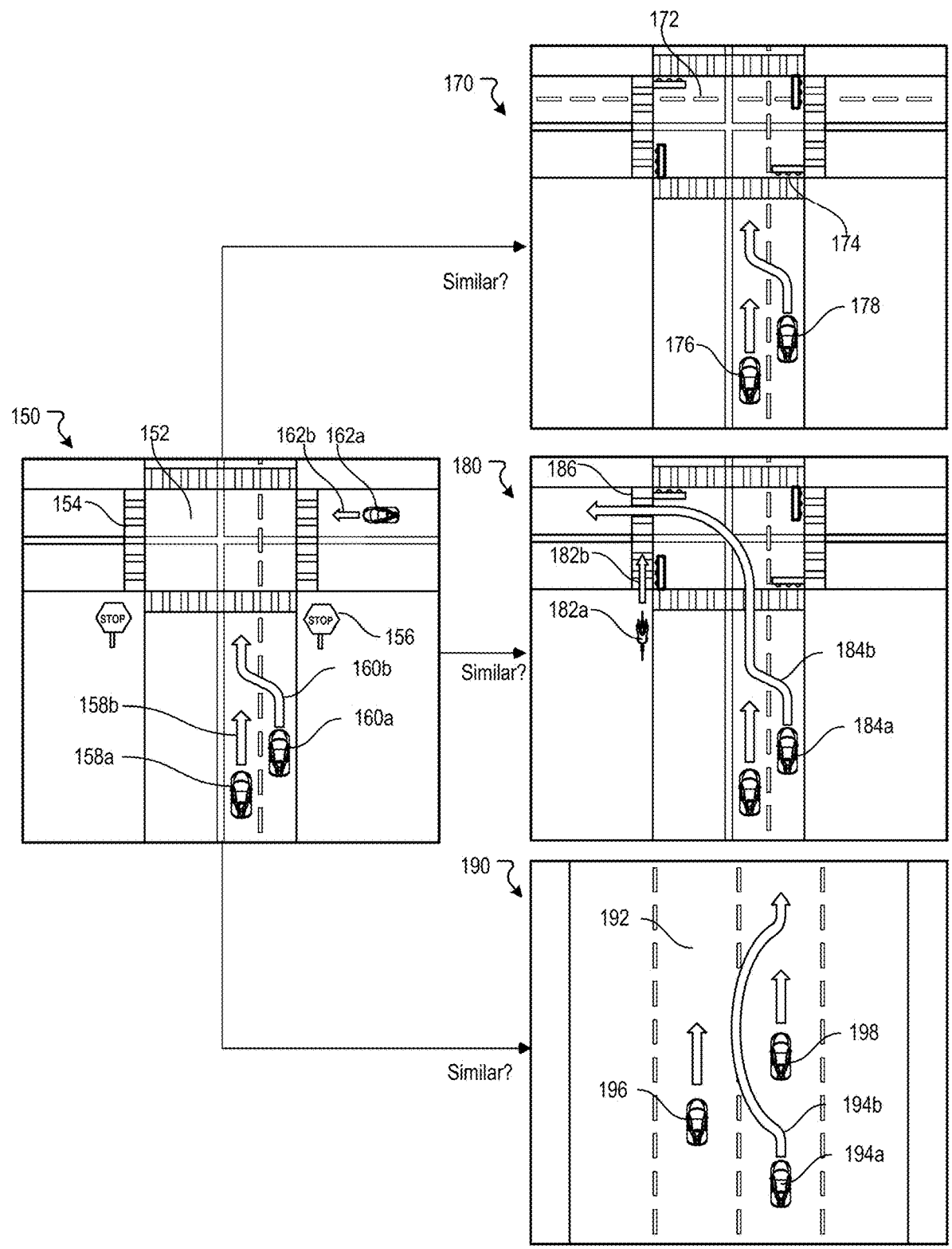
FIG. 1B illustrates example advantages when retrieving information describing relevant scenarios, according to an embodiment of the present technology.

FIG. 1B depicts an improved approach for searching similar scenarios. For example, a searcher can perform a search for an example scenario 150 which is identical to the example scenario 100 of FIG. 1A. The example scenario 150 illustrates three vehicles 158a, 160a, 162a navigating an intersection 152. The intersection 152 has at least one crosswalk 154. The intersection 152 has at least one stop sign 156 to control oncoming traffic. The vehicles 158a, 160a, 162a navigate the intersection 152 with their respective trajectories 158b, 160b, 162b. The searcher may desire to identify similar scenarios with a vehicle 160a having a trajectory 160b where the vehicle 160a cuts in front of another vehicle 158a at a four-way intersection 152. Assume, for example, that three other scenarios 170, 180, 190 are known and maintained in a data store. A first scenario 170 is substantially similar to the example scenario 150 but its intersection 172 has at least one traffic light 174 instead of the at least one stop sign 156 of the example scenario 150. Additionally, the first scenario 170 only illustrates two vehicles 176, 178 but does not illustrate the third vehicle 162a of the example scenario 150. A second scenario 180 is less similar to the example scenario 150 than the first scenario 170 in that the second scenario 180 additionally has a cyclist 182a with a trajectory of 182b crossing a crosswalk 186. In addition, the second scenario 180 further differs from the example scenario 150 in that a vehicle 184a has a trajectory 184b making a left turn after a cut-in. A third scenario 190 is substantially different from the example scenario 150. The third scenario 190 illustrates a vehicle 194a travelling on a highway 192 passing two vehicles 196, 198 with a trajectory 194b. The improved approach can generate respective encoded images representing the example scenario 150, first scenario 170, second scenario 180, and third scenario 190. Further, the improved approach can generate embeddings representing the scenarios 150, 170, 180, and 190 using a trained machine learning model. When a searcher identifies the example scenario 150 as a scenario for which to find similar scenarios, the improved approach of the present technology can determine that the first scenario 170 has an associated embedding that is within a threshold distance (e.g., neighboring) of an embedding associated with the example scenario 150 in vector space. In this example, information describing the first scenario 170 can be provided as a query result, such as a search result. Advantageously, the improved approach allows the searcher to refine the number of scenarios that are returned in the query result by adjusting the distance threshold. For example, the searcher may adjust similarity criteria to allow embeddings that are further away in the vector space to be deemed as "neighboring" and, thus, deemed similar to the example scenario 150. In FIG. 1B, the searcher can relax the similarity criteria so that the second scenario 180 is also returned as query result while still excluding the third scenario 190. Accordingly, the improved approach addresses shortcomings of conventional approaches. Scenarios that are determined to be similar based on the improved approach can be used for myriad applications. For example, the scenarios can be used to further train (or refine) the model, run computer-based simulations of an autonomous navigation system, and evaluate various performance metrics of the autonomous navigation system. More details discussing the present technology are provided below.

Figure 2:
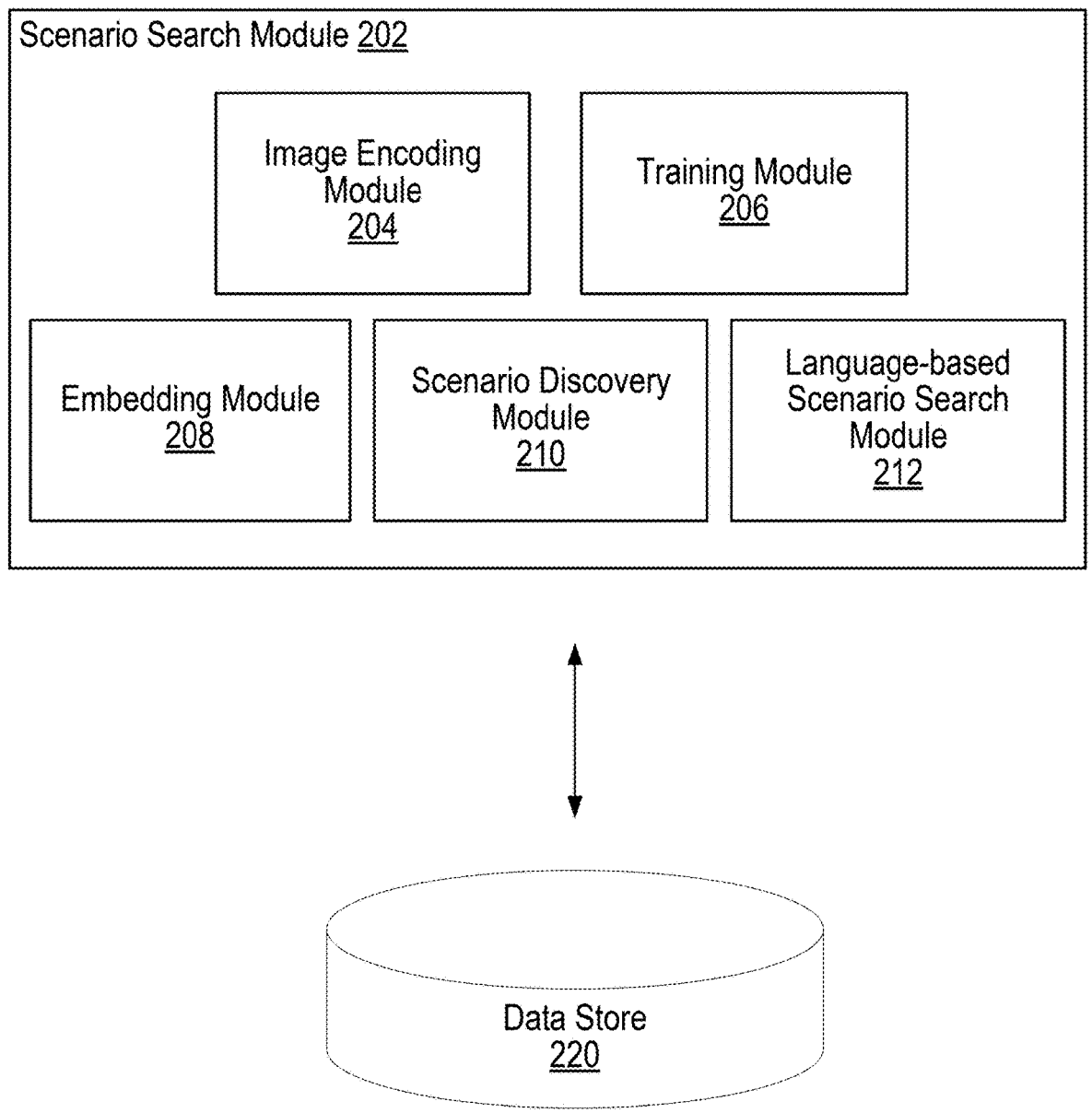
FIG. 2 illustrates an example system including an example scenario search module, according to an embodiment of the present technology.

FIG. 2 illustrates an example system 200 including an example scenario search module 202, according to an embodiment of the present technology. As illustrated with the example system 200, the scenario search module 202 can be configured to include an image encoding module 204, a training module 206, an embedding module 208, a scenario discovery module 210, and a language-based scenario search module 212.

In some instances, the example system 200 can include at least one data store 220. The scenario search module 202 can be configured to communicate and operate with the at least one data store 220. The at least one data store 220 can be configured to maintain and store various types of data. For example, the data store 220 can store information describing a variety of scenarios. For example, the data store 220 can maintain data captured from autonomous navigation missions relating to various scenarios, simulation scenarios, performance evaluation scenarios, or the like. Additionally, the data store 220 can be configured to maintain and store various training data, encoded images, embeddings, and other data used and generated by the scenario search module 202, as described below.

Figure 11:
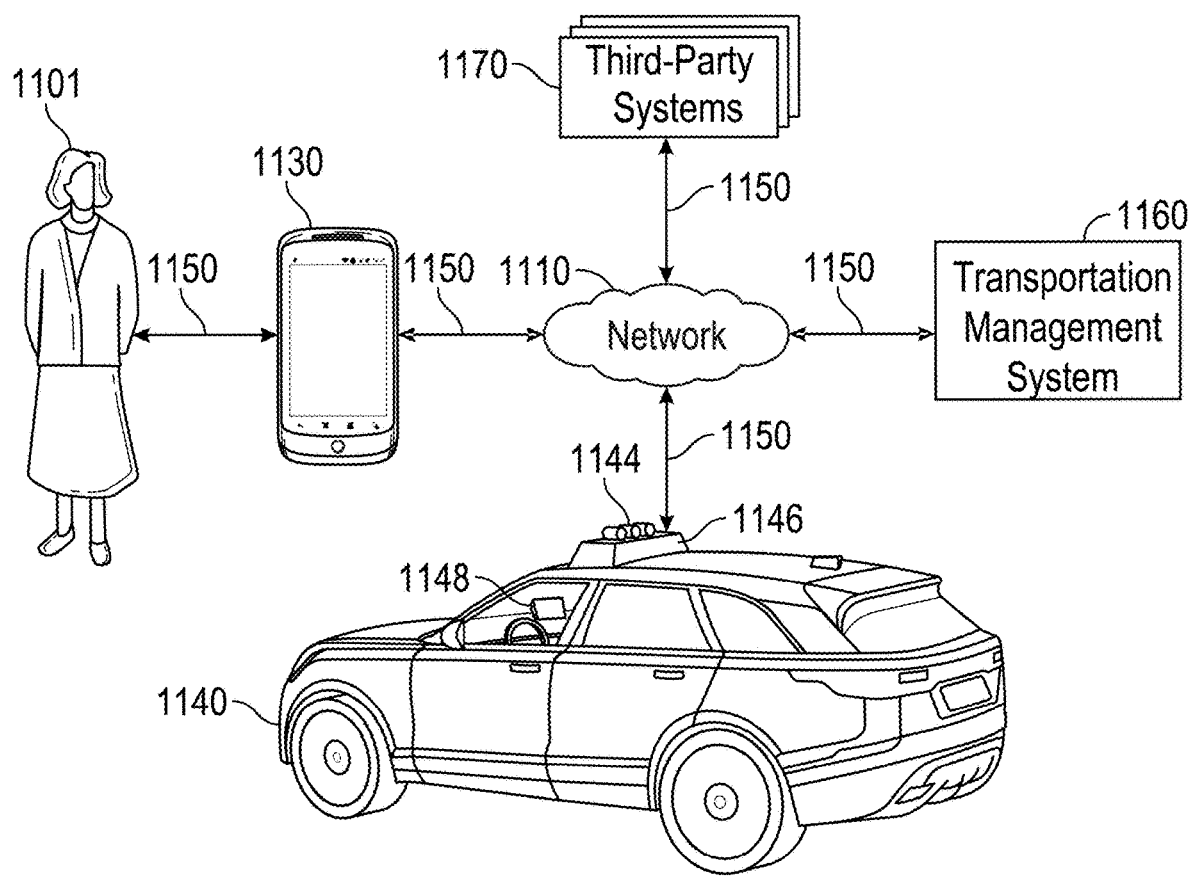
FIG. 11 illustrates an example block diagram of a transportation management environment, according to an embodiment of the present technology.

In some embodiments, some or all of the functionality performed by the scenario search module 202 and its sub-modules may be performed by one or more backend computing systems, such as a transportation management system 1160 of FIG. 11. In some embodiments, some or all of the functionality performed by the scenario search module 202 and its sub-modules may be performed by one or more computing systems implemented in a vehicle, such as a vehicle 1140 of FIG. 11. In some embodiments, some or all data stored in the data store 220 can be stored by the transportation management system 1160 of FIG. 11. In some embodiments, some or all data stored in the data store 220 can be stored by the vehicle 1140 of FIG. 11. The components (e.g., modules, elements, etc.) shown in this figure and all figures herein are exemplary only, and other implementations may include additional, fewer, integrated, or different components. Some components may not be shown so as not to obscure relevant details.

In various embodiments, the scenario search module 202 can generate encoded images of scenarios that standardize representation of environments and various agents navigating within the environments. For example, scenarios can be captured, or otherwise generated, from various sources at various angles and scales. The encoded images can be rendered as bird's-eye views of the scenarios that are standardized in angle and scale. In the encoded images, a particular type of agent can be encoded with a particular color compared to a different type of agent encoded with a different color. The encoded images can capture movements of the agents over a particular period of time, such as 3 seconds, 5 seconds, 10 seconds, or the like. The encoded images, as they are standardized, can be used as training data for a model, such as a machine learning model. The scenario search module 202 can train the model that associates the encoded images with respective embeddings in vector space based on machine learning techniques. Embeddings can be used to determine a level of similarity between respective scenarios represented by the embeddings. Based on the level of similarity, scenarios that are similar to a queried scenario can be identified and returned. More details discussing the present technology are provided below.

The image encoding module 204 can be configured to encode images of scenarios. An encoded image can be a rendering of an environment and agents within the environment. The images of scenarios can be retrieved from a catalog, such as the catalog of scenarios 402 of FIG. 4 which can include simulation scenarios. Additionally, the images of scenarios can originate from vehicle data store 408 of FIG. 4 comprising sensor data of vehicles navigating with one or more sensors in environments. As an example, LIDAR data can provide the images of scenarios to the vehicle data store 408. An example encoded image can be a bird's-eye view (BEV) of the environment, such as an example encoded image 300 of FIG. 3. The image encoding module 204 can encode an image to include semantic map information and movements of various agents over a period of time within the environment. The encoded image can be a raster image (e.g., a bitmap image) that is appropriate for machine learning techniques. Pixels in the encoded image can be of particular colors and contrasts to represent and differentiate the semantic map information, the agents, movements of the agents, objects, states of the objects, and the like. The pixels in the encoded image can additionally capture temporal information. For example, the pixels can represent movements of the agents over a particular period of time, such as 3 seconds, 5 seconds, 10 seconds, or the like with graded colors or contrasts. A search query can specify the temporal aspects. For example, an image query can provide an image encoded with temporal information. For example, where 1 second is represented with a single graded color, a movement of a particular vehicle over 5 seconds can be represented with five grades of the color. By providing such an encoded image as an image query, the searcher can limit a search to scenarios represented over 5 seconds. More details are provided with respect to FIG. 3. In some embodiments, a non-image query can provide one or more parameters associated with temporal aspects of a scenario. The search query can narrow or broaden the scope of a search by adjusting the one or more parameters. For example, if the search query specifies a time frame of 3 seconds, a query result may exclude scenarios having a time frame of 5 seconds as those scenarios might not have had enough time to fully play out in 3 seconds.

The training module 206 can be configured to train a model based on the encoded images. The model can be a machine learning model and training the model can generate, for example, a neural network that generates embeddings from encoded images. Various machine learning techniques can be utilized to train the model. One example machine learning technique can be triplet loss, which is further described with respect to FIG. 5.

The embedding module 208 can be configured to use the trained model to map scenarios, or encoded images of the scenarios, to embeddings in a vector space, such as a low-dimensional vector space. The scenarios can be retrieved from the data store 220 and encoded images can be generated for the scenarios by the image encoding module 204. The encoded images can be provided to the trained model trained by the training module 206. The model can determine respective embeddings for the encoded images. For example, the model can arrange the encoded images within the low-dimensional vector space. Each of the encoded images can be associated with an embedding that gets adjusted, as training progresses, to better reflect its location in the low-dimensional vector space. The embeddings can be used to determine a measure of similarity based on a distance metric between an embedding and another embedding. A smaller distance metric indicates a higher degree of similarity between a first embedding and a second embedding, which can be translated to a higher degree of similarity between a first scenario represented by the first embedding and a second scenario represented by the second embedding. A greater distance metric determined between the first embedding and a third embedding, which can be translated to a lower degree of similarity between the first scenario and a third scenario associated with the third embedding, indicates a higher degree of similarity between the first and second scenarios compared to the first and third scenarios. The embedding module 208 can store the embeddings in the data store 220.

The scenario discovery module 210 can be configured to discover similar scenarios based on embeddings associated with scenarios. An embedding can be generated for an encoded image associated with a search query. The search query can be an image query, a non-image query, or a combination of both. With respect to the image query, in some embodiments, the image query can be selected from a catalogue of previously generated encoded images representing various scenarios. In some embodiments, the image query can be an image provided by a searcher and an encoded image can be generated based on the image for use in the search. With respect to the non-image query, in some embodiments, the non-image query can be a combination of values, such as the mission ID and the timestamp, that identifies a particular image to be used in generating an encoded image. In some embodiments, the non-image query can include some parameters that may not be represented in encoded images to further limit the search. For example, the non-image query can specify parameters relating to weather conditions, which can be available as metadata associated with respective encoded images, to further limit query results. A trained model can output one or more embeddings for one or more encoded images representing one or more scenarios identified by the search query. The scenario discovery module 210 can receive an example embedding generated for an example scenario and identify similar scenarios based on the example embedding. It is possible to map each scenario into a vector space based on associated embeddings. A distance metric, such as a cosine similarity distance metric, can represent a degree of similarity between one embedding and another embedding. The similarity distance metric also represents a degree of similarity between a first scenario associated with the one embedding and a second scenario associated with the other embedding. As embeddings, associated scenarios need not be described further. The embeddings allow similarity comparison of seemingly dissimilar scenarios as well as similar scenarios. For example, conventional approaches relying on hierarchical structures may have categorized a first scenario depicting a pedestrian into a category associated with pedestrians while categorizing a second scenario depicting a cyclist into a category associated with cyclists even when the first and second scenarios are otherwise similar. The vector space and the similarity distance metric provides means to a searcher to identify and search based on such similarities that may not otherwise be apparent. The scenario discovery module 210 can identify neighboring embeddings in the vector space that are within some threshold similarity distance of the example embedding. The threshold similarity distance can be adjusted to increase or decrease the number of neighboring embeddings that are identified. For the above example of the first and second scenarios which are likely positioned close in the vector space, increasing the threshold similarity distance can help identify additional scenarios—including a third scenario not previously identified as a similar scenario—as a similar scenario of the first scenario. In some embodiments, the threshold similarity distance can be based on cosine similarity. In some embodiments, the neighboring embeddings can be identified based on algorithms such as nearest-neighbor search algorithms. As each of the neighboring embeddings represent a respective scenario, similar scenarios can be identified based on the neighboring embeddings.

The language-based scenario search module 212 can be configured to associate scenarios with high-level primitives based on low-level parameters associated with the scenarios. The language-based scenario search module 212 can apply various rules on the low-level parameters associated with a scenario to determine whether the low-level parameters satisfy one or more conditions of a high-level primitive and, when the conditions are satisfied, associate the scenario with the high-level primitive. The language-based scenario search module 212 can make available, or otherwise expose, high-level primitives associated with scenarios as top-level search query attributes. The high-level primitives can allow a searcher to conduct searches for scenarios based on keywords and natural language processing (NLP) searches. More details describing the language-based scenario search module 212 are provided below in reference to FIG. 8.

Figure 3:
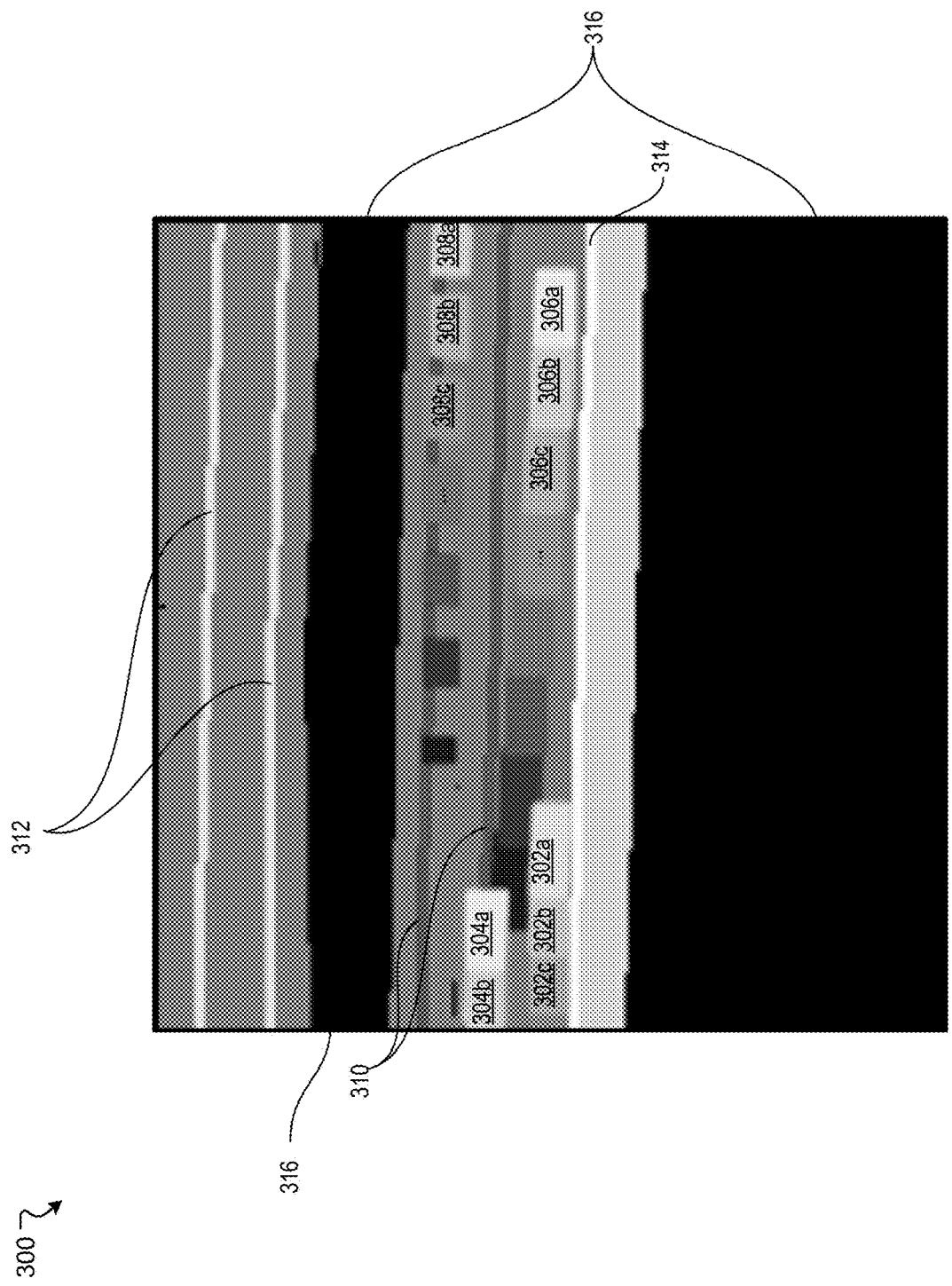
FIG. 3 illustrates an example encoded image of an example scenario, according to an embodiment of the present technology.

FIG. 3 illustrates an example encoded image 300 of an example scenario, according to an embodiment of the present technology. The example encoded image 300 may be generated based on a scenario, which can be captured in a bird's-eye view (BEV) representation of the scenario. For example, a scenario represented by the example encoded image 300 has four vehicles 302, 304, 306, 308 navigating along an eastbound highway 310 from, based on an orientation of the example encoded image 300, west to east. In this scenario, the third vehicle 306 is cutting in front of the first vehicle 302 at a high velocity. The example encoded image 300 can represent this scenario among other information. For example, the example encoded image 300 may include semantic map information and represent the semantic map information in the encoded image 300 using various colors and contrasts. For example, the eastbound highway 310 can be encoded with a particular color or contrast and westbound highway 312 can be encoded with a different color or contrast. As another example, a guardrail 314 can be encoded with yet another color or contrast. Each of the vehicles 302, 304, 306, 308 can be encoded with different graded colors or contrasts to indicate respective velocity and trajectories. For example, an eastbound trajectory of a first vehicle 302 can be encoded with graded contrasts 302a, 302b, and 302c; a trajectory of a second vehicle 304 with graded contrasts 304a and 304b; a trajectory of a third vehicle 306 with graded contrasts 306a, 306b, and 306c; and a trajectory of a fourth vehicle 308a with graded contrasts 308a, 308b, 308c. As indicated by distances between respective graded contrasts, the encoding shows the fourth vehicle 308 moving at a faster velocity than the first vehicle 302. Accordingly, the example encoded image 300 can represent temporal information (e.g., time or speed), spatial information (e.g., position or distance), or a combination of both (e.g., velocity, acceleration, trajectory, or the like) within the example encoded image 300. Differences in the size of pixel boxes representing the vehicles 302, 304, 206, 308 can indicate differences in the sizes of the vehicles 302, 304, 306, 308. In some embodiments, different types of vehicles can be color-coded differently. For example, a motorcycle can be color-coded in scarlet, a sedan in yellow, and a truck in red. Optionally, additional agents (e.g., pedestrians, cyclists, etc.) and objects (e.g., traffic lights, stop signs) can likewise be encoded into the example encoded image 300. In some encoded images, states of objects can additionally be encoded. For example, a red traffic light can be color-coded differently than a green traffic light. Portions 316 of the encoded image 300 that do not contain relevant information can be encoded a particular color. Accordingly, the example encoded image 300 can encode multiple agents and their respective trajectories over a time period. The example encoded image 300 can be a rasterized (e.g., bitmapped) image. The example encoded image 300 can be used as part of training data to train a model that generates embeddings for scenarios. Additionally, in some embodiments, the example encoded image 300 can be used as a search query so that encoded images representing similar scenarios can be identified based on the encoded image 300 alone. For example, a searcher may have a set of encoded images that the searcher maintains as representative query scenarios and submit an encoded image as a search query. While the example encoded image 300 is illustrated in black and white, encoded images are not limited to black and white and can be encoded in various colors.

Figure 4:
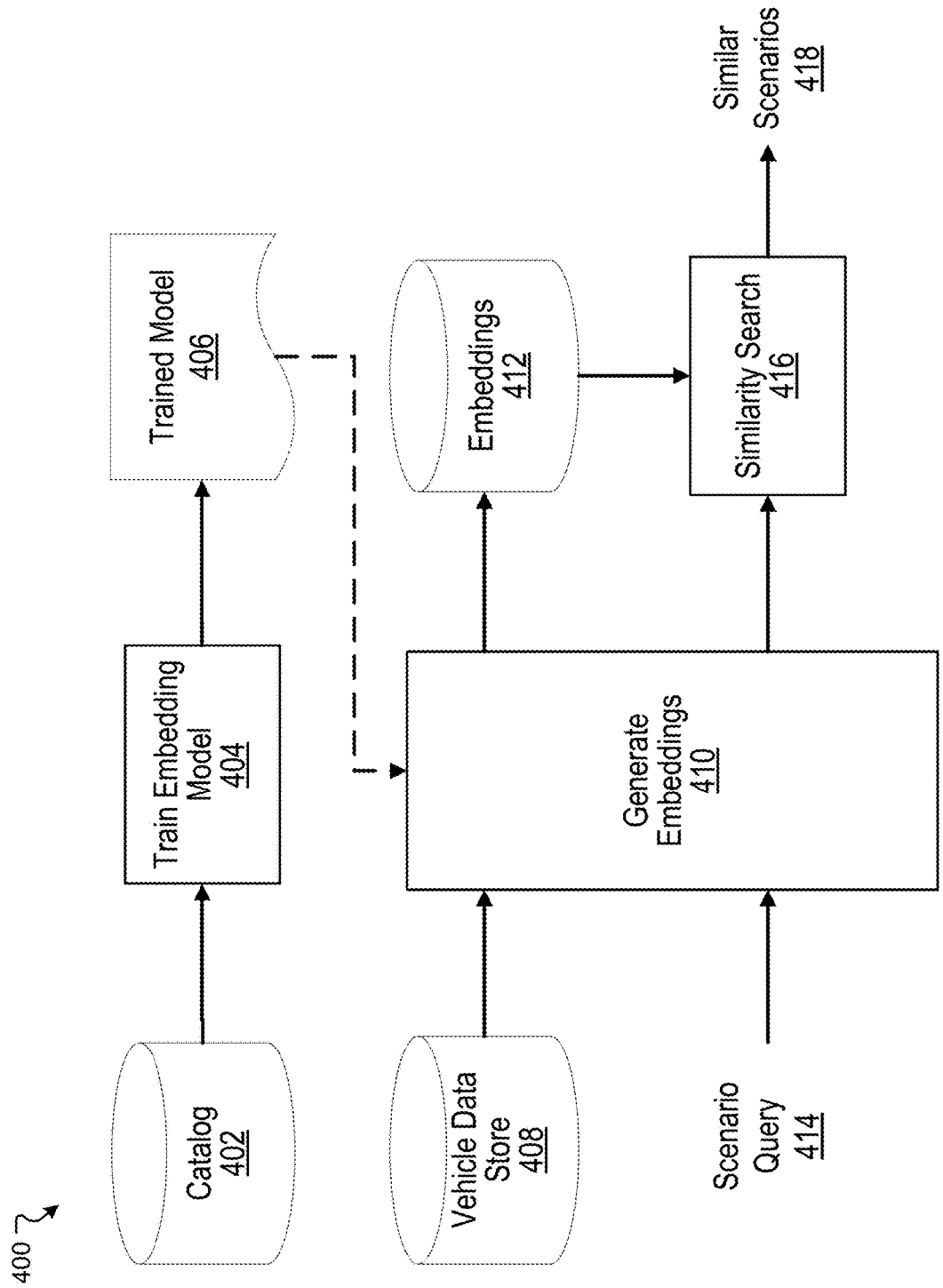
FIG. 4 illustrates example diagram for training a model to identify similar scenarios based on embeddings generated for images of the similar scenarios, according to an embodiment of the present technology.

FIG. 4 illustrates an example diagram 400 of training a model to identify similar scenarios based on embeddings generated for images of the similar scenarios, according to an embodiment of the present technology. A catalog 402 of scenario information can be maintained in a data store. In some embodiments, the scenarios can be stored in the catalog 402 as representative images or frames of videos. In some embodiments, the images or frames can be processed to generate the encoded images. At block 404, some or all of the scenarios in the catalog 402 can be used as training data to train an embedding model. Various machine learning techniques can be utilized to train the embedding model. One example machine learning technique can be triplet loss, which is further described with respect to FIG. 5. After the training 404, a trained model 406 can be generated. The trained model 406 can receive encoded images as inputs and generate 410 respective embeddings 412 as outputs. In some embodiments, all or substantially all of the example diagram 400 can be automated. For example, processes relating to acquiring scenarios from databases 402, 408, indexing scenario 404, 406, 410, maintaining embeddings in a vector space 412, and performing a similarity search 416 can all be automated. In some embodiments, the only human input to this automated process may be formulating a scenario query 414.

Once training is performed, scenario data captured by vehicles can be accessed from a vehicle data store 408. The scenario data can be encoded, as described above, and provided as input to the trained model 406 to generate respective embeddings 412. For example, a set of successive images can be generated based on sensor data captured by one or more sensors of a vehicle navigating an environment. The set of successive images can represent a particular scenario experienced by the vehicle over some period of time. The set of successive images can be stored in the vehicle data store 408 together with an associated mission identifier (ID) identifying the set. Each image of the set of successive images can be stored together with a respective timestamp. Some or all of the images in the set can be encoded like the example encoded image 300 of FIG. 3 and provided to the trained model 406 to generate and store a corresponding embedding 412 for the scenario represented by the set of successive images. In some embodiments, the catalog 402 and the vehicle data store 408 may share some scenarios. In other words, embeddings can be generated for some scenarios used as part of training data for the trained model 406 and the embeddings can be used to identify the scenarios as similar scenarios in a search. The embeddings 412 can be stored in a data store.

After embeddings are generated for scenarios, a searcher can provide a scenario query 414. In some embodiments, a scenario query 414 can be associated with a drawing (e.g., a freehand drawing, sketch, computer-aided drawing, etc.) that represents a scenario. In such embodiments, when processing the scenario query 414, image processing techniques can be applied to determine images that are similar to the drawing. In some embodiments, the scenario query 414 can provide identifying information associated with an example scenario and any additional search criteria. In some embodiments, a scenario query 414 can be associated with a drawing (e.g., a freehand drawing, sketch, computer-aided drawing, etc.) that represents a scenario. In such embodiments, when processing the scenario query 414, image processing techniques can be applied to determine images that are similar to the drawing. The identifying information can be an example encoded image, such as the example encoded image 300 of FIG. 3. As another example, the identifying information can identify a source set of successive images, such as a video of a scenario, and a timestamp that identifies a particular image in the set. Further, the identifying information can comprise a mission ID of a vehicle mission comprising a particular scenario and a timestamp that identifies a particular portion associated with the scenario in the vehicle mission. The mission ID and timestamp can be used to identify a set of images representing the scenario. In some embodiments, a searcher may interact with an interface to control playback of the vehicle mission, stop the playback, note a timestamp of the playback, and submit the mission ID and the timestamp. Advantageously, the searcher can identify an example scenario without knowledge of how scenarios are categorized in the catalog 402 or vehicle data store 408. The additional search criteria may include search syntax associated with various high level primitives, which are described further in detail in relation to the language-based scenario search module 212 of FIG. 2. Further, the additional search criteria may include search syntax associated with various information. For example, a query, such as the scenario query 414, can specify information on traffic light states to find "traffic light straggler" scenarios, which are scenarios where an ego is at an intersection controlled by a traffic light and has the right of way to enter the intersection but cannot because a vehicle coming from a different lane running its red light is still in the intersection. If the searcher is interested in "traffic light straggler" scenarios, knowledge of states of the traffic light states can make the difference between an interesting and uninteresting scenario. Accordingly, the searcher may specify the traffic light states in a query to additionally limit query results beyond limiting query results based on a threshold similarity criteria. In some embodiments, the traffic light states, travel directions, road markers, and various other information for making a determination of a "traffic light straggler" scenario can be encoded into the encoded images. For example, traffic light states of red, yellow, or green can be color-coded differently in the encoded images. As another example, designated directions of travel (e.g., eastbound, westbound, left turn only lane, or the like) can be coded with different colors or widths. One or more encoded images can be analyzed to limit query results to encoded images that represent the "traffic light straggler" scenarios. In some embodiments, additional information may not be directly encoded into an encoded image but may be provided as side (or separate) information (e.g., non-visual data) that accompanies the encoded image. For example, the additional information of "traffic light straggler" can be a keyword that is associated with an encoded image as metadata to the encoded image. In some embodiments, the additional information can be associated with an embedding as a vector of an additional dimension (e.g., non-visual indicator vector) with a value, such as an enumerated value. For example, embeddings can be expanded to have an additional dimension associated with "traffic light states" having a value from a set of {"0", "1"}, where "0" indicates non-existence of the "traffic light straggler" and "1" indicates existence of the "traffic light straggler." When the searcher submits a query that limits query results to scenarios representing the "traffic light straggler" condition, the query can limit query results to scenarios associated with embeddings having "1" in the non-visual indicator vector associated with the "traffic light straggler."

At block 410, an example embedding can be generated for the scenario query 414, as described above. At block 416, a similarity search 416 can be performed for the example embedding against other embeddings 412 of scenarios to identify neighboring embeddings in vector space. In some embodiments, the similarity search 416 can be based on a threshold similarity criteria such as a threshold distance criteria based on cosine similarity between the example embedding and the neighboring embeddings. In some embodiments, the neighboring embeddings can be identified based on algorithms such as nearest-neighbor search algorithms. Since the neighboring embeddings are associated with or represent other scenarios mapped near the example embedding in the vector space, similar scenarios 418 can be identified based on the neighboring embeddings.

Figure 5:
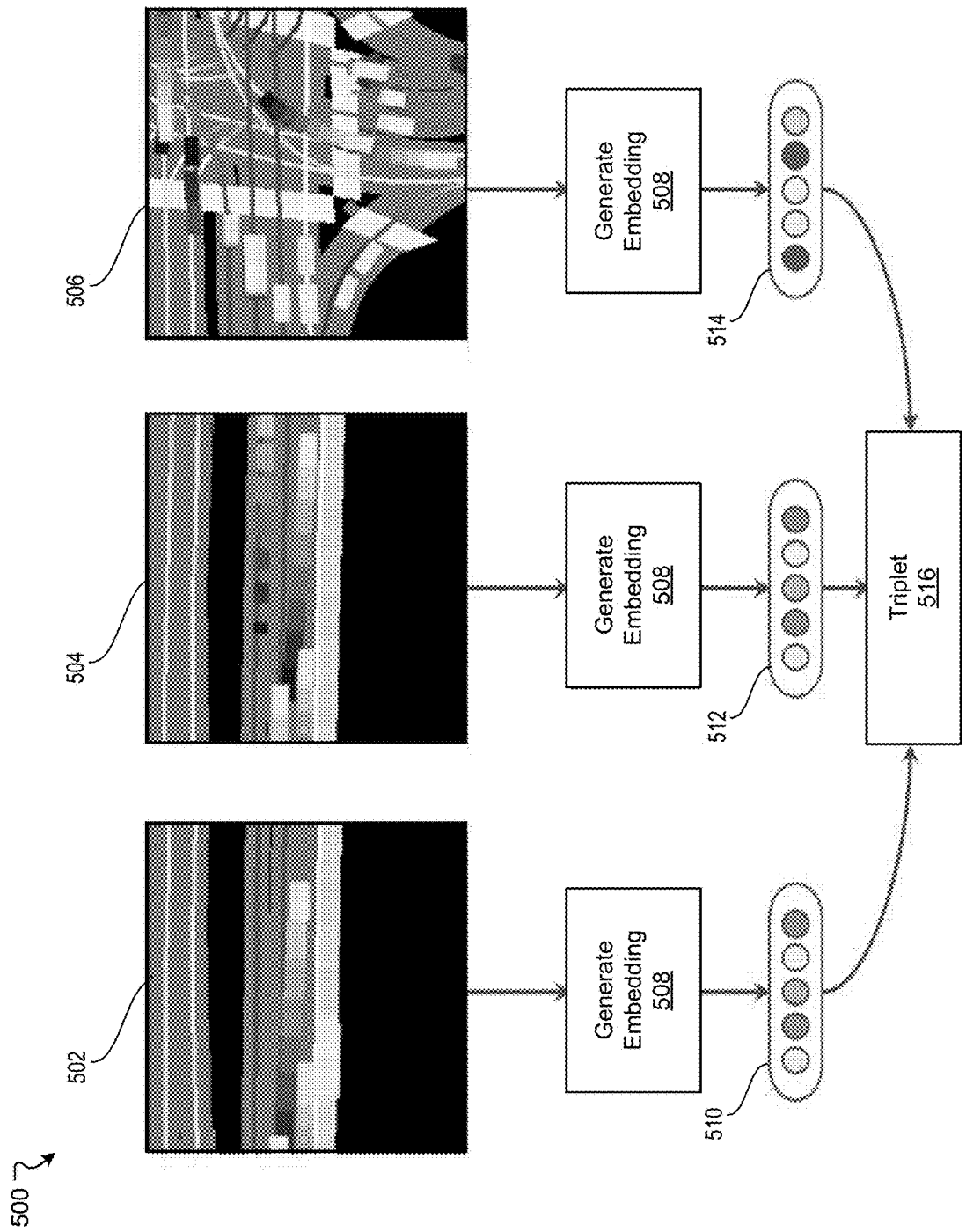
FIG. 5 illustrates an example diagram for training a model based on triplet loss, according to an embodiment of the present technology.

FIG. 5 illustrates an example diagram 500 of training a model based on a triplet loss technique, according to an embodiment of the present technology. The triplet loss technique can utilize sets of an anchor representation, a positive representation, and a negative representation as training data. The three representations in a set can be, respectively, an anchor encoded image 504, a positive encoded image 502, and a negative encoded image 506. In this example diagram 500, the anchor encoded image 504 is the example 300 of FIG. 3. The triplet loss technique can generate respective embeddings 508 for each of the encoded images 502, 504, 506. For example, an anchor embedding 512 is generated for the anchor encoded image 504, a positive embedding 510 is generated for the positive encoded image 502, and a negative embedding 514 is generated for the negative encoded image 506. The encoded images 502, 504, 506 are selected such that the encoded images 502, 504, 506 satisfy one or more levels of similarity criteria. The positive embedding 510 of the positive encoded image 502 has a first level of similarity, such as a cosine similarity distance, between the anchor embedding 512 and the positive embedding 510. The negative encoded image 506 is selected such that the negative embedding 514 of the negative encoded image 506 has a second level of similarity that is greater than the first level of similarity between the anchor embedding 512 and the positive embedding 514. Visually, the anchor encoded image 504 is closer in similarity to the positive encoded image 502 whereas, relative to the positive encoded image 502, the anchor encoded image 504 is less similar to the negative encoded image 506. Likewise, the anchor embedding 512 is closer in vector space of embeddings to the positive embedding 510 than to the negative embedding 514. Accordingly, the three encoded images 502, 504, 506 form a triplet 516 to be used as training data. The triplet 516 causes a vector distance in embedding space between the anchor embedding 512 and the positive embedding 510 to be smaller than a vector distance between the anchor embedding 512 and the negative embedding 514.

In some embodiments, selection of the triplet 516 can be automated. For example, where a catalog of scenarios is categorized and grouped based on a taxonomy (e.g., a hierarchical structure), a positive encoded image 502 can be generated based on a scenario within the same category (or group) of an example scenario represented by an anchor encoded image 504. A negative encoded image 506 can be generated based on a scenario that does not share a same category (or group) as the example scenario represented by the anchor encoded image 504. For example, the anchor encoded image 504 and the positive encoded image 502 can be selected from the same category (or group) whereas the negative encoded image 506 can be selected from a different category (or group). The triplet loss technique or algorithm is presented as one example machine learning model training method. Other training methods, such as methods based on Kullback-Leibler loss, can also be applied.

Figure 6A:
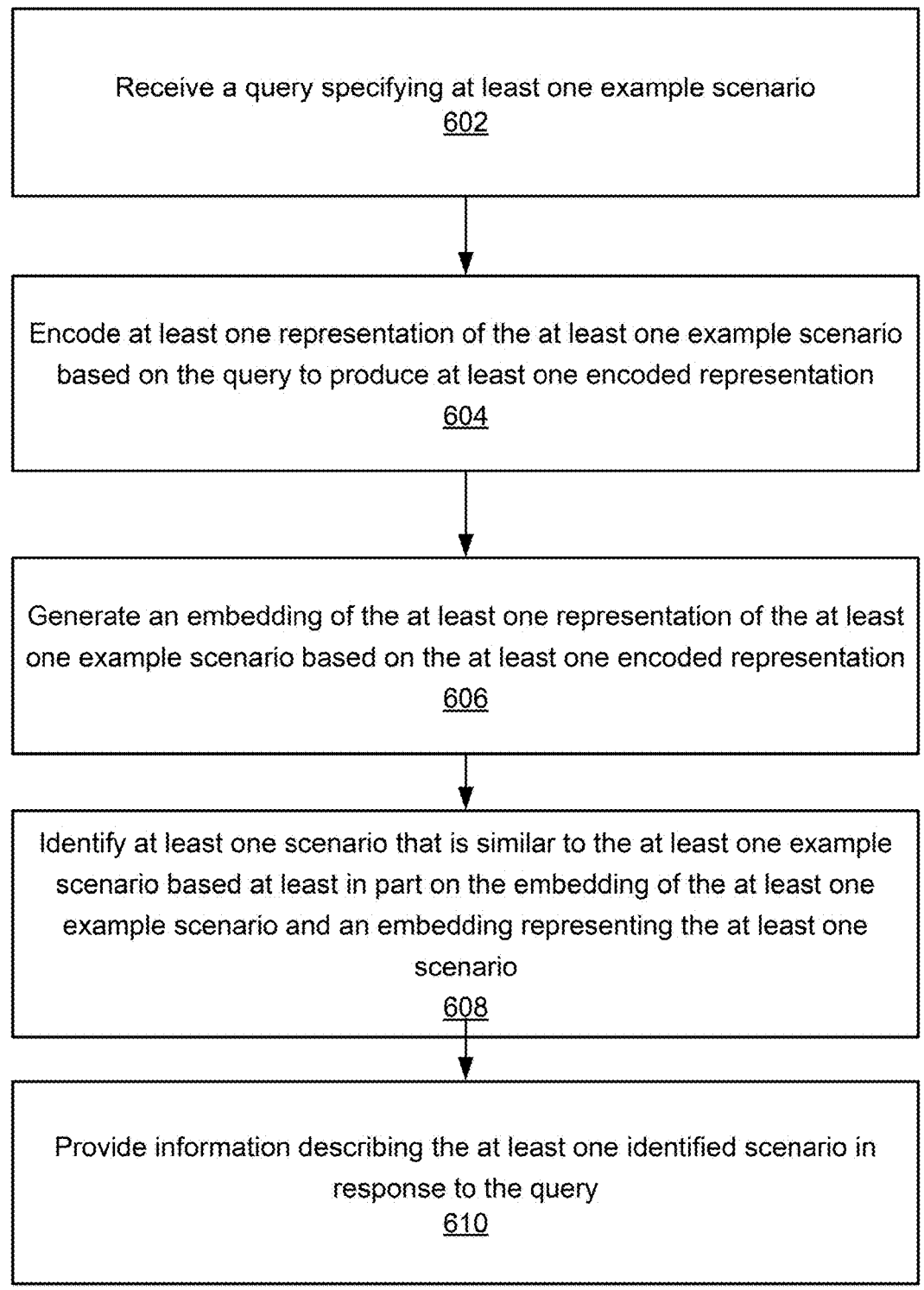

FIG. 6A illustrates an example method 600, according to an embodiment of the present technology. At block 602, a query specifying at least one example scenario can be received. At block 604, at least one representation of the at least one example scenario can be encoded based on the query to produce at least one encoded image. At block 606, an embedding of the at least one representation of the at least one example scenario can be generated based on the at least one encoded representation. At block 608, at least one scenario that is similar to the at least example scenario can be identified based at least in part on the embedding of the at least one representation of the at least one example scenario and an embedding representing the at least one scenario. At block 610, information describing the at least one identified scenario can be provided in response to the query.

FIG. 6B illustrates an example method 620, according to an embodiment of the present technology. At block 622, an anchor representation comprising a first encoded image representing a scenario can be acquired. At block 624, a positive representation comprising a second encoded image representing a scenario that has a threshold level of similarity to the anchor representation can be acquired. At block 626, a negative representation comprising a third encoded image representing a scenario that does not have the threshold level of similarity to the anchor representation can be acquired. At block 628, a machine learning model can be trained with the anchor representation, the positive representation, and the negative representation.

Scenario Searching Using Parameter Condition Groupings

Figure 7A:
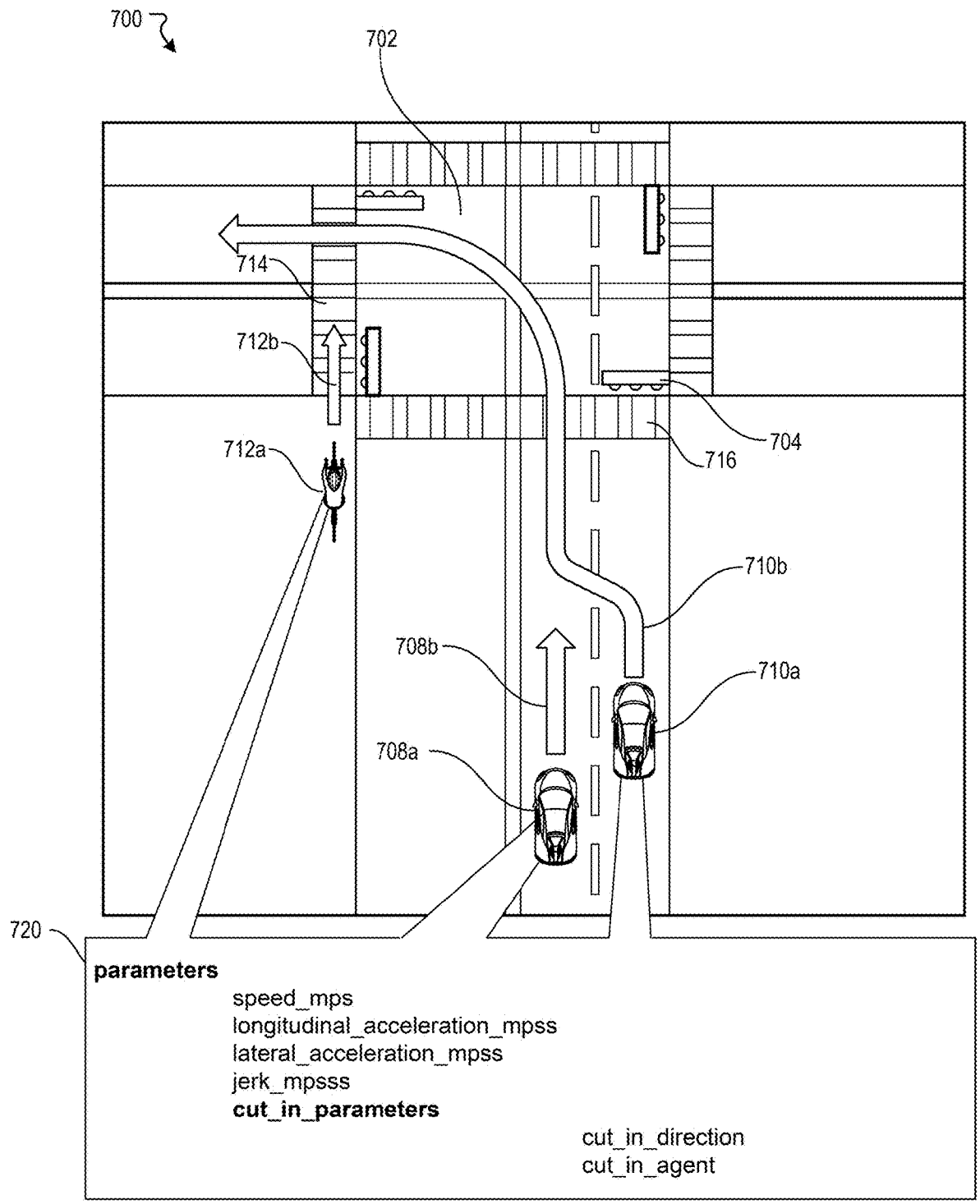
FIGS. 7A-7B illustrate challenges that may be experienced in retrieving information describing relevant scenarios and improvements thereof, according to an embodiment of the present technology.

As described, under conventional approaches, a catalog of scenarios stored on a data store can be searched based on a taxonomy where the taxonomy is represented in a hierarchical structure. In addition to the taxonomy and the hierarchical structure, the conventional approaches can rely on various low-level parameters that describe an environment and agents navigating in the environment. For example, FIG. 7A illustrates various low-level parameters that may be assigned to an ego and various agents in an environment. As shown, FIG. 7A illustrates an example scenario 700 in which a first vehicle 708a, a second vehicle 710a, and a cyclist 712a are navigating an intersection 702 controlled by at least one traffic light 704. The first vehicle 708a, second vehicle 710a, and cyclist 712a are moving (or predicted to move) along respective trajectories 708b, 710b, 712b. The cyclist 712a is crossing a crosswalk 714. Under existing approaches, each of the agents 708a, 710a, 712a, and their respective trajectories can be described with a collection of low-level parameters 720. The collection of low-level parameters can include, for example, speed in meters per second (speed_mps), longitudinal acceleration in meters per second squared (longitudinal_acceleration_mpss), lateral acceleration in meters per second squared (lateral_acceleration_mpss), and jerking movement in meters per second cubed (jerk_mpsss), among other low-level parameters. Additionally, in order to describe vehicle cut-in behavior, a set of low-level parameters including cut-in direction (cut_in_direction) and cut-in agent (cut_in_agent) can be relevant. As shown, low-level parameters can be nested, thereby increasing their complexity and potential usage. Under conventional approaches, a searcher seeking a particular scenario would need to know relevant parameters beforehand and enter a particular combination of low-level parameters and corresponding values (or ranges) for the scenario. However, formulating queries based on such low-level parameters is not intuitive and, as a result, can make scenario searching difficult and time consuming. Accordingly, the conventional approaches do not provide sufficiently intuitive and simple means of discovering scenarios of interest. Further, as many scenarios of interest may involve interactions between multiple agents, accurately capturing such interactions with low-level parameter-based queries can pose additional challenges. For example, assume a searcher is interested in discovering scenarios similar to the example scenario 700 in which a vehicle cuts in front of another vehicle to make a left turn through a crosswalk while another agent is attempting to travel through the crosswalk. In this example, the searcher will be challenged to successfully discover this scenario using queries that rely solely on low-level parameters to describe scenarios.

Figure 7B:
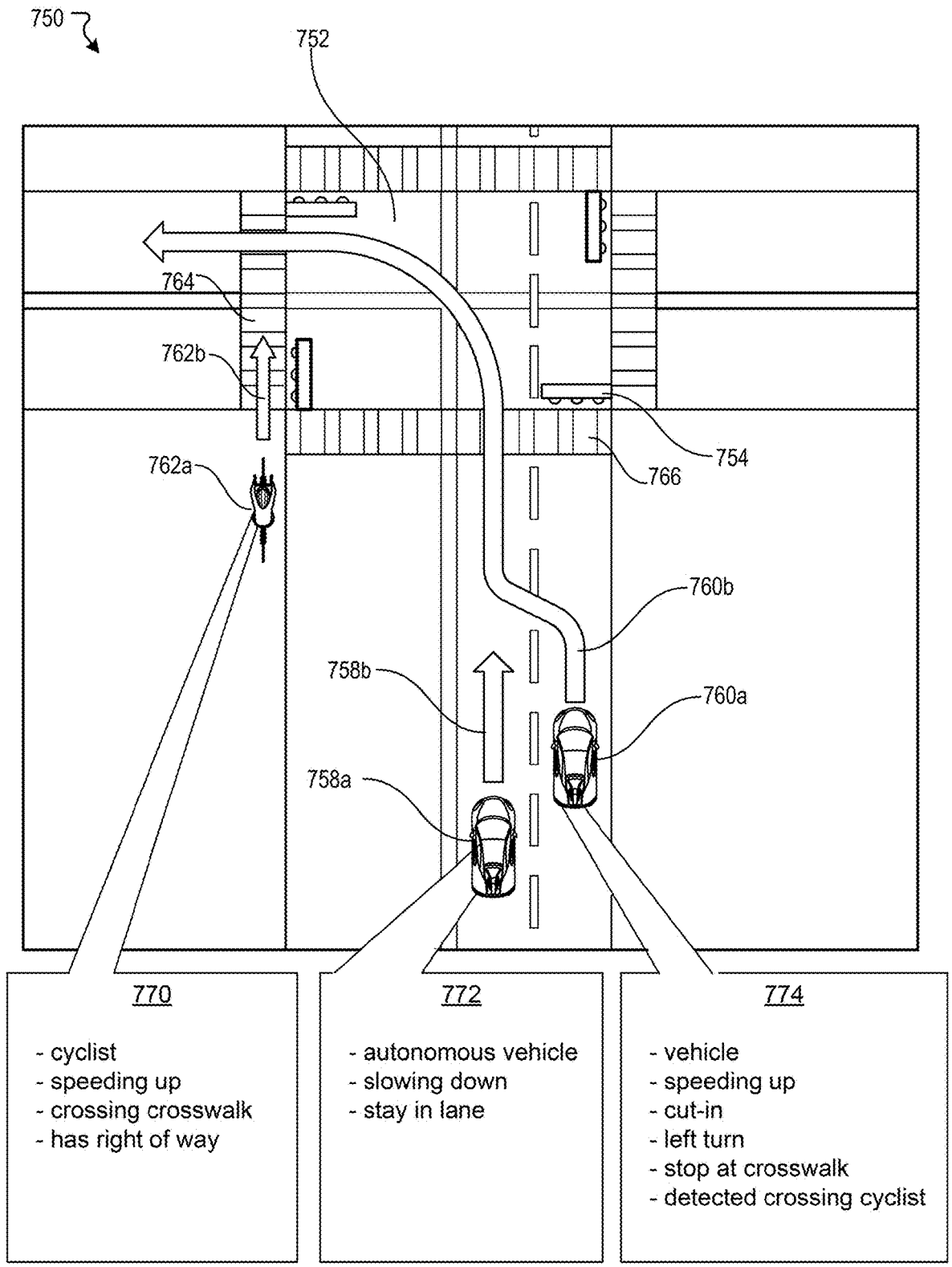

An improved approach in accordance with the present technology overcomes the foregoing and other disadvantages associated with such conventional approaches. In various embodiments, high-level primitives describing agent behavior can encompass low-level parameters associated with an ego or various agents. For example, rather than relying on a collection of low-level parameters to represent a scenario involving a vehicle cutting in front of another vehicle (e.g., vehicle speed, distance, trajectory, and the like), a high-level primitive, such as "vehicle cut-in", can be used to represent the collection of aforementioned low-level parameters. Other examples of high-level primitives can include "agent left-turn", "agent right-turn", "agent slowing down", "agent speeding up", "agent cut-out", "agent nudge", "agent lane change", or the like. Some high-level primitives can describe particular actions taken by an agent, such as "agent remained in lane", "agent moved out of lane to avoid collision", or the like. The low-level parameters can comprise one or more classifications associated with the ego or various agents including, for example, agent type such as ego, pedestrian, cyclist, truck, or the like. In some instances, the low-level parameters can comprise metrics relating to temporal metrics (e.g., time or speed), spatial metrics (e.g., position or distance), or a combination of both (e.g., velocity or acceleration) associated with the ego or various agents. In some instances, the low-level parameters can comprise the metrics over time, such as positions of an agent over time (e.g., a trajectory of the agent). In some embodiments, the metrics can be defined in relation to another agent, for example, distance between an ego and the other agent. In some instances, the low-level parameters can comprise occlusion of the ego or various agents by one or more other agents or obstacles. The high-level primitives can comprise one or any combination of a behavior, predicted behavior, intent (e.g., a left turn signal of a vehicle indicates its intent to make a left turn), or map semantics (e.g., at a crosswalk, traffic light, one-way street, busy intersection) associated with the ego or various agents. In some instances, the high-level primitives can comprise a behavior or predicted behavior, intent, or map semantics in relation to an ego or other agents (e.g., moving out of lane to avoid a potential collision with another vehicle). As such, the high-level primitives can be used to more intuitively annotate scenarios and facilitate their discovery. For example, FIG. 7B illustrates an example scenario 750 identical to FIG. 7A, in which a vehicle is attempting to make a left turn across a crosswalk while another agent is crossing the crosswalk. The example scenario 750 comprises a first vehicle 758a, a second vehicle 760a, and a cyclist 762a navigating an intersection 752 controlled by at least one traffic light 754. Each of the vehicles 758a, 760a and the cyclist 762a are moving (or predicted to move) along respective trajectories 758b, 760b, and 762b. The cyclist 762a is crossing a crosswalk 764. The cyclist 762a can be annotated with a set of high-level primitives 770 to describe its behavior. These high-level primitives can include, for example, a "speeding up" high-level primitive that indicates the cyclist 762a is increasing speed, a "crossing crosswalk" high-level primitive that indicates the cyclist 762a is crossing the crosswalk 764, and a "has right of way" high-level primitive that indicates the cyclist 762a has the right of way. Similarly, the first vehicle 758a can be annotated with a set of high-level primitives 772 to describe its behavior. These high-level primitives can include, for example, a "slowing down" high-level primitive that indicates the vehicle 758a is reducing speed and a "stay in lane" high-level primitive to indicate the vehicle 758a remains in its lane. The first vehicle 758a may be an ego and the ego can be collecting data relating to the example scenario 750. Some of the low-level parameters that the first vehicle 758a (e.g., the ego) collects can be "ego distance to an agent", "ego hard braking" based on deceleration, or the like. Further, the second vehicle 760a can be annotated with a set of high-level primitives 774 to describe its behavior. These high-level primitives can include, for example, a "speeding up" high-level primitive that indicates the vehicle 760a is increasing speed, a "cut-in" high-level primitive that indicates the vehicle 760a is cutting in front of another agent, a "left turn" high-level primitive that indicates the vehicle 760a is attempting a left turn, a "stop at crosswalk" high-level primitive that indicates the vehicle 760a is to stop at a crosswalk 766 before attempting the left turn, and a "detected crossing cyclist" high-level primitive that indicates the vehicle 760a is perceiving the cyclist 762a crossing a crosswalk 764. Under the improved approach of the present technology, a searcher can construct a search query using such high-level primitives to identify myriad types of scenarios without requiring the details associated with queries involving low-level parameters.

In some embodiments, the high-level primitives can be associated with one or more keywords. These keywords can be surfaced, for example, as top-level query attributes. As a result, the searcher can conduct searches for particular scenarios based on a set of keywords without requiring the searcher to individually specify a set of low-level parameters. For example, rather than constructing a query based on low-level parameters (e.g., "WHERE parameters.lateral_acceleration_mpss<−2.0"), the searcher can simply search for a corresponding keyword "agent left-turn". In some embodiments, the improved approach of the present technology can additionally associate free-form text descriptions (e.g., unstructured text descriptions) with the high-level primitives and allow discovery of relevant scenarios using natural language search techniques. For example, the example scenario 750 can be identified based on a natural language processing (NLP) search query. In this example, a searcher can simply conduct a natural language search (e.g., "cut-in by a vehicle to make a left turn across a crosswalk when an agent is crossing the crosswalk") to identify the example scenario 750. More details discussing the present technology are provided below.

Figure 8:
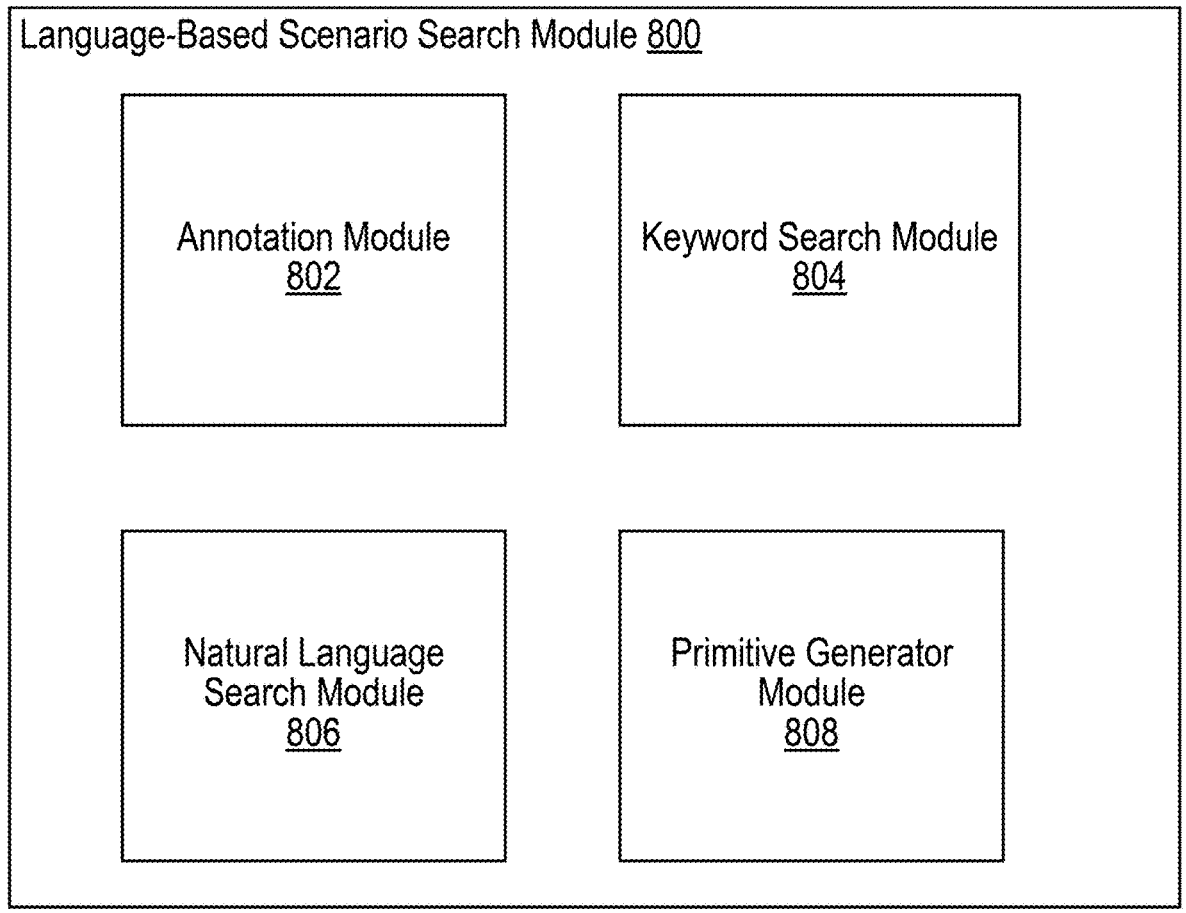
FIG. 8 illustrates an example language-based scenario search module, according to an embodiment of the present technology.

FIG. 8 illustrates an example language-based scenario search module 800, according to an embodiment of the present technology. The language-based scenario search module 800 can be implemented as the language-based scenario search module 212 of FIG. 2. As illustrated, the language-based scenario search module 800 can be configured to include an annotation module 802, a keyword search module 804, a natural language search module 806, and a primitive generator module 808. In some instances, the language-based scenario search module 800 can be configured to communicate and operate with the at least one data store 220 of FIG. 2. The at least one data store 220 can maintain and store low-level parameters associated with the scenarios. Where scenarios are represented as videos or sets of successive images, low-level parameters and associated values of the low-level parameters can be maintained for each portion of a video or a set of successive images. Additionally, the data store 220 can be configured to maintain and store various annotations, tags, or other associations of one or more high-level primitives appropriate for a scenario. In some embodiments, the at least one data store 220 can be configured to store and maintain text descriptions of the scenarios in associations with the scenarios.

In various embodiments, the language-based scenario search module 800 can associate scenarios with high-level primitives based on low-level parameters associated with the scenarios. The language-based scenario search module 800 can apply various rules to the low-level parameters associated with a scenario to determine whether the low-level parameters satisfy one or more conditions of a high-level primitive and, when the conditions are satisfied, associate the scenario with the high-level primitive. The language-based scenario search module 800 can make available, or otherwise expose, high-level primitives associated with scenarios as top-level search attributes. The high-level primitives can allow a searcher to conduct keyword searches of scenarios and natural language processing (NLP) searches.

The annotation module 802 can be configured to annotate, tag, or otherwise associate one or more high-level primitives with scenarios. Example high-level primitives include "left turn", "right turn", "slow down", "speed up", "cut-in", "cut-out", "nudge", "lane change", stay in lane", "move out of lane to avoid collision", or the like. As described with respect to the example scenario 700 of FIG. 7A, agents can be associated with low-level parameters. For example, a vehicle making a cut-in followed by a left turn, such as a vehicle 710*a* of FIG. 7A, is associated with a set of low-level parameters that can describe its "cut-in" and "left turn" trajectory 710*b* over some period of time. For example, the relevant-low level parameters of the vehicle 710*a* of FIG. 7A can include:

At time t=0 second (cut-in):
  parameters.longitudinal_acceleration_mpss=5.2 meters/second$^2$
  parameters.lateral_acceleration_mpss=−0.2 meters/second$^2$
  parameters.cut_in_parameters_cut_in_direction=0.63 rad
  parameters.cut_in_parameters.agent=enum_self
. . .

At time t=3 second (slowing down to a crosswalk 716 for a left turn):
  parameters.longitudinal_acceleration_mpss=−0.14 meters/second$^2$
  parameters.lateral_acceleration_mpss=0.07 meters/second$^2$
  parameters.cut_in_parameters_cut_in_direction=0.51 rad
  parameters.cut_in_parameters.agent=enum_self
. . .

At time t=11 second (making the left turn at the crosswalk 716):
  parameters.longitudinal_acceleration_mpss=3.5 meters/second$^2$
  parameters.lateral_acceleration_mpss=−0.15 meters/second$^2$ At time t=12 (stopped before a crosswalk 714 waiting for a cyclist 712*a* to cross 712*b*):
  parameters.longitudinal_acceleration_mpss=0 meters/second$^2$
  parameters.lateral_acceleration_mpss=0 meters/second$^2$
. . .

At time t=23 (complete the left turn):
  parameters.longitudinal_acceleration_mpss=0.0 meters/second$^2$
  parameters.lateral_acceleration_mpss=−5.7 meters/second$^2$.

Since the trajectories of agents are measured over a period of time, the low-level parameters are associated with temporal and spatial aspects (e.g., position, velocity, acceleration, or the like). The annotation module 802 can analyze the low-level parameters to determine whether a particular group of low-level parameters and their corresponding values satisfy an annotation rule of a high-level primitive. If the annotation rule is satisfied, the high-level primitive can be used to search for the scenario associated with the particular group of low-level parameters in lieu of searching for the particular group of low-level parameters and their corresponding values. Annotation rules can be defined in a number of ways. For example, an annotation rule can be based on a low-level parameter value, such as "parameters.lateral_acceleration_mpss<−2.0 meters/second$^2$" to satisfy an annotation rule for a "left turn." The annotation rule can be a time-window rule in which one more parameter conditions must be satisfied over a particular time period, such that the annotation rule for a "left turn" must be maintained over at least a two-second time period. The annotation rules can be defined based on any combination of temporal and spatial aspects associated with one or more low-level parameters. In some embodiments, more complex annotations rules can be applied to the low-level parameters, such as a "nudge" rule that analyzes and determines interactions between multiple agents and respective associated low-level parameters. Continuing with the example above, the annotation module 802 can associate a high-level primitive of "cut-in" with the vehicle 760*a* for t=0 to t=3. Further, the annotation module 802 can associate a high-level primitive "left turn" with the vehicle 760*a* for t=11 to t=23 and another high-level primitive "detected crossing cyclist 762*a*" for t=13 to t=18. Accordingly, the vehicle 760*a* of the example scenario 750 of FIG. 7B can be associated with the high-level primitives "cut-in", "left turn", "detected crossing cyclist", or the like. The application of the annotation rules can be performed using machine learning techniques. The high-level primitives can be tags or other types of metadata stored and maintained in the data store 220 with information associating the high-level primitives with their corresponding scenarios. The high-level primitives, once defined with associated annotation rules, can be stored and maintained in a library of high-level primitives. The annotation module 802 can apply the high-level primitives in the library to any existing scenarios and new scenarios added to the data store 220. As described, one or more high-level primitives can be applied, in any combination, to the existing scenarios and the new scenarios. The annotation module 802 can use any annotator algorithm to annotate scenarios with the one or more high-level primitives based on the low-level parameters. For example, the annotation module 802 can annotate the scenarios with the high-level primitives based on rule-based annotations, machine learning techniques, or the like. In some embodiments, the high-level primitives, annotation rules, or associations of the high-level primitives with the scenarios can be stored on a separate database from a scenarios database. The databases can be separated physically, logically, or virtually and the separate database can be an intermediate database. The annotation module 802 can annotate the scenarios in a separate process from a query process and annotate, store, and maintain the annotations in the intermediate database. The annotation module 802 may execute annotator algorithms that can be complex and demand much computing resources to complete. A search query comprising high-level primitives can be decomposed into a first part for the intermediate database and a second part for the scenario database. In some embodiments, high-level primitives in the first part can be translated into low-level parameters based on the intermediate database and merged with the second part before conducting a scenario search for the search query. In some embodiments, the search query can, when executed, retrieve a list of scenarios (e.g., a list of identifiers associated with the scenarios) that satisfy one or more high-level primitives based on the first part for the intermediate database and the list of scenarios can be further narrowed based on the second part for the scenarios database. With the separation of the databases, the search query may be executed without affecting search latency experienced by a searcher submitting the search query.

The keyword search module 804 can be configured to perform a scenario search based on high-level primitives. A list of available high-level primitives can be maintained as a list of canonical keywords. A searcher may synthesize a search query through a search interface based on one or more keywords. The keyword search module 804 can allow the search query to utilize a conventional query language, such as a structured query language (SQL), and any features of the conventional query language. For example, an example search query can be synthesized to identify a set of scenarios that are associated with both "left turn" AND "cut-in" high-level primitives, thereby restricting the search to scenarios that are annotated with both "left turn" and "cut-in" high-level primitives. Another example search query can be "speed up" AND "yellow light" high-level primitives. The example search queries can be analogized to inner join SQL queries. Similarly, other search queries analogous to a left outer join, a right outer join, or a full outer join can be expressed based on the high-level primitives.

In some instances, a search query can comprise a join on timestamp (e.g., a temporal join). For example, the search query can specify that a first action happening within a certain duration of a second action. Such search query comprising the temporal join on timestamp can be a search query specifying an ego stopping at a stop sign of an intersection (e.g., the first action) which enters the intersection (e.g., the second action) within 2 seconds (e.g., a criterion on the transition duration). The search query can utilize SQL windowing functions to implement the temporal join.

In some instances, a search query can comprise a join on one or more agents. For example, the search query can specify that a given agent is associated with a first action followed by a second action. Such search query comprising the join on one or more agents can be a search query specifying an agent navigating in a lane adjacent to an ego (e.g., the first action) followed by a change of the lane to position the agent in front of the ego in the same lane as the ego (e.g., the second action). The search query can be implemented with logical syntax based on identifiers associated with the ego or the one or more agents.

In some instances, a search query can comprise a join on relative position of an ego or various agents. The search query can specify that a given agent is associated with an action while the given agent is being left/right/behind/in front of/within a certain distance of/in the same lane as/in the lane adjacent to/within a given angle of the ego or another agent. For example, the search query can specify a scenario in which a vehicle in front of an ego is in the same lane as the ego slows down abruptly. The join on relative position is possible due to the road environment being a highly structured environment that provide few degrees of liberty for an ego or various agents within the highly structured environment. Further, the join on relative position can be based on analogizing the ego and various agents to rectangles within lanes and based on observations that each scenario may involve a limited number of relevant agents. Accordingly, the language-based scenario search module 800 or the keyword search module 804 can perform the join on relative position. Many variations are possible.

The natural language search module 806 can be configured to use various natural language processing (NLP) techniques to perform a search of scenarios. The NLP techniques can be used in combination with the keyword search module 804. For example, a natural language search query for an "agent cut-in followed by left turn" can be interpreted to distinguish scenarios involving an "agent left turn followed by cut-in". In contrast, a keyword search query for both a "left turn" AND "cut-in" would return scenarios involving both an "agent cut-in followed by left turn" and an "agent left turn followed by cut-in". In some embodiments, natural language search queries can include time-based parameters. For example, a natural language search query can be expanded further to search for a "left turn followed by cut-in within 5 seconds but not within 2 seconds."

A search query can be associated with a large number of low-level parameters and high-level primitives with a variety of composition rules (e.g., joins on timestamp, joins on agents, joins on relative position, or the like). The search query allows identification of a large number of scenarios with a small number of the low-level parameters and the high-level primitives. In some embodiments, the search query can comprise one or more natural language search queries. The language-based scenario search module 800 can reduce development effort associated with scenario search and increase expressivity of the scenario search.

In some embodiments, scenarios can be associated with text descriptions of the scenarios. For example, the example scenario 750 of FIG. 7B can be associated with the following text description: "A cyclist located at the south-west corner of an intersection crosses the west crosswalk heading north. A first northbound vehicle in parallel cuts in front of a second northbound vehicle to make a left turn toward the west crosswalk but slows down after detecting the cyclist." Based on this text description, the natural language search module 806 can search for scenarios based on a natural language search query, such as "left turn into a cyclist crossing a crosswalk". In this example, the example scenario 750 can be provided as a scenario that satisfies the query. In some embodiments, one or more natural language search queries can be joined to further narrow scenario query results. For example, an additional natural language search query of "where the first northbound vehicle runs a red light" can be joined with the natural language search query. In some embodiments, the natural language search query can be based on regular expressions compatible with known tools including SQL, sed, vi, awk, or the like. In some embodiments, a natural language search query can be combined with a keyword search query to constitute a hybrid query to search for scenarios.

The primitive generator module 808 can be configured to generate high-level primitives. In some embodiments, the primitive generator module 808 can create a new high-level primitive and add the new high-level primitive to a library of existing high-level primitives. The new high-level primitive can be associated with its own annotation rule. The primitive generator module 808 may generate the new high-level primitive based on machine learning techniques. For example, when low-level parameters and associated values are determined to be searched often according to logs of search queries, and when there is no existing high-level primitive that correspond to the low-level parameters and the associated values, the primitive generator module 808 may generate a new high-level primitive. The new high-level primitive may be given a default keyword (e.g., "new_keyword_5"). In some instances, a keyword can be determined based on unstructured text descriptions associated with query results. For example, if it is determined that a substantial portion of the query results are associated with text descriptions of "a vehicle cutting in to make a left turn", the keyword can be given "cut-in", "left turn", or "cut-in for a left turn." In some embodiments, the primitive generator module 808 may combine two or more existing keywords to generate a new keyword, such as the "cut-in for a left turn" above, when it is determined that the two high-level primitives "cut-in" and "left turn" are provided in search queries in a substantial portion of the search queries. Accordingly, the search queries comprising low-level parameters or high-level primitives, and query results can be used to train a machine learning model that generates new high-level primitives. The library of high-level primitives is not static and can be modified to include more or fewer high-level primitives. After generation of the new high-level primitive, the annotation module 806 may associate the new high-level primitive with at least a subset of the query results of the search queries.

Figure 9:
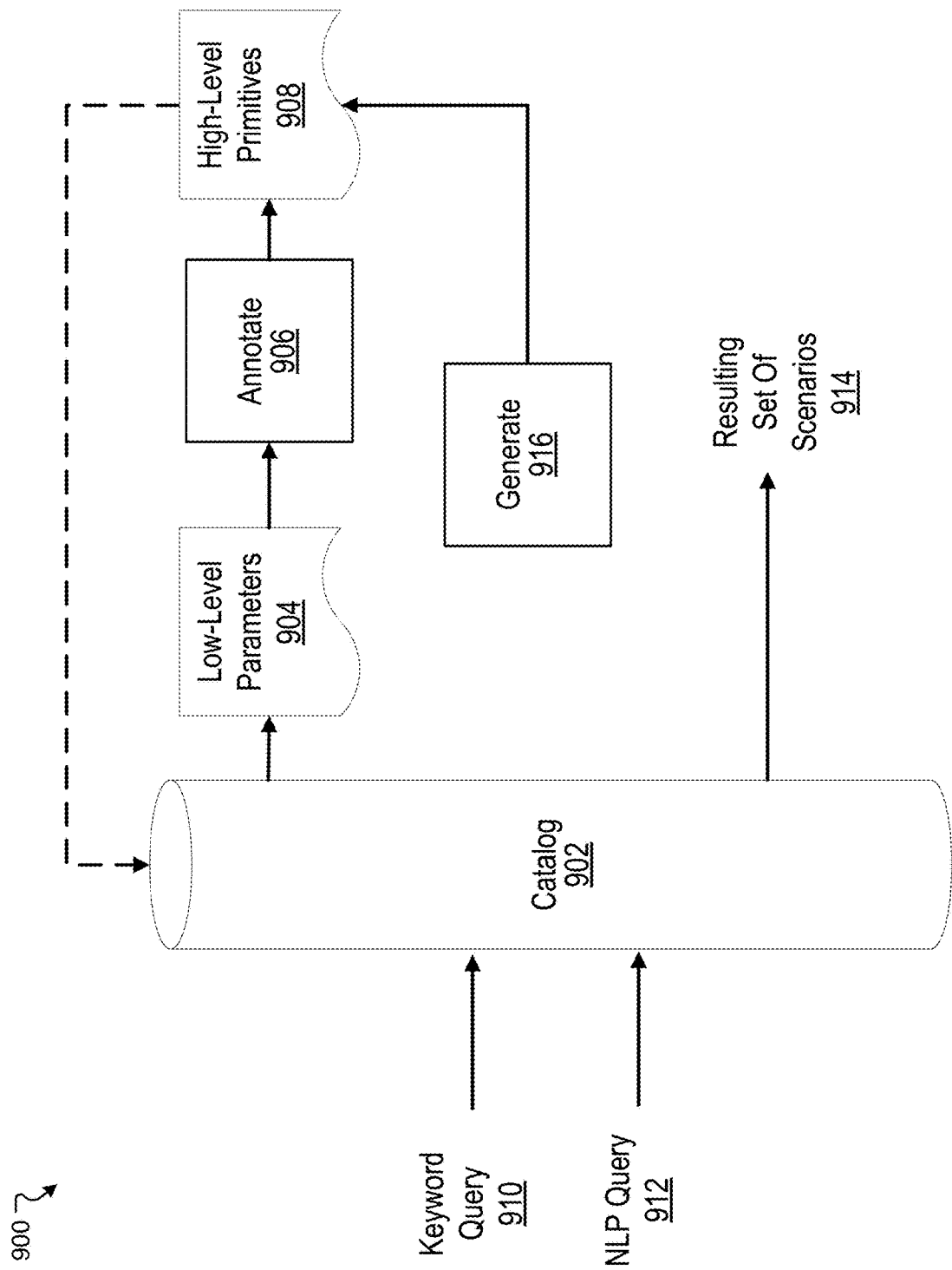
FIG. 9 illustrates example diagram of performing a language-based scenario search, according to an embodiment of the present technology.

FIG. 9 illustrates example diagram 900 of performing a language-based scenario search, according to an embodiment of the present technology. A catalog of scenarios 902 can be provided. The scenarios can comprise various low-level parameters 904. Low-level parameters 904 associated with a scenario can be analyzed to determine whether the low-level parameters 904 satisfy conditions of various annotation rules associated with one or more high-level primitives 908. When it is determined that the low-level parameters 904 and their corresponding values satisfy the conditions, the scenario can be annotated (or tagged) 906 with the one or more high-level primitives 908. In some embodiments, annotations can be associated with timestamps designating a particular portion of the associated scenario. The one or more high-level primitives 908 and their association with the scenario can be stored and maintained along with the catalog 902.

To perform the language-based scenario search, a searcher can submit a keyword query 910, an NLP query 912, or a combination of the keyword query 910 and the NLP query 912. A resulting set of scenarios 914 from the catalog 902 can be provided in response to a query. Query results can be returned as identifiers of the scenarios or relevant portions of the scenarios. In some embodiments, the relevant portions of the scenarios can be represented with mission identifiers and one or more timestamps. The example diagram 900 also illustrates generation 916 of a new high-level primitive for inclusion into existing high-level primitives. The generation 916 of the new high-level primitive can be performed by, for example, the primitive generator module 808 of FIG. 8. When none of the existing high-level primitives match low-level parameters, the new high-level primitive can be generated.

Some or all of the language-based scenario search module 800 may be automated and only human involvement may be limited to providing a search query. In some instances, one or more developers may review query results to improve accuracy of the annotation module 802. Improving the accuracy of the annotation module 802 may involve refining a training process or a trained model.

Figure 10A:
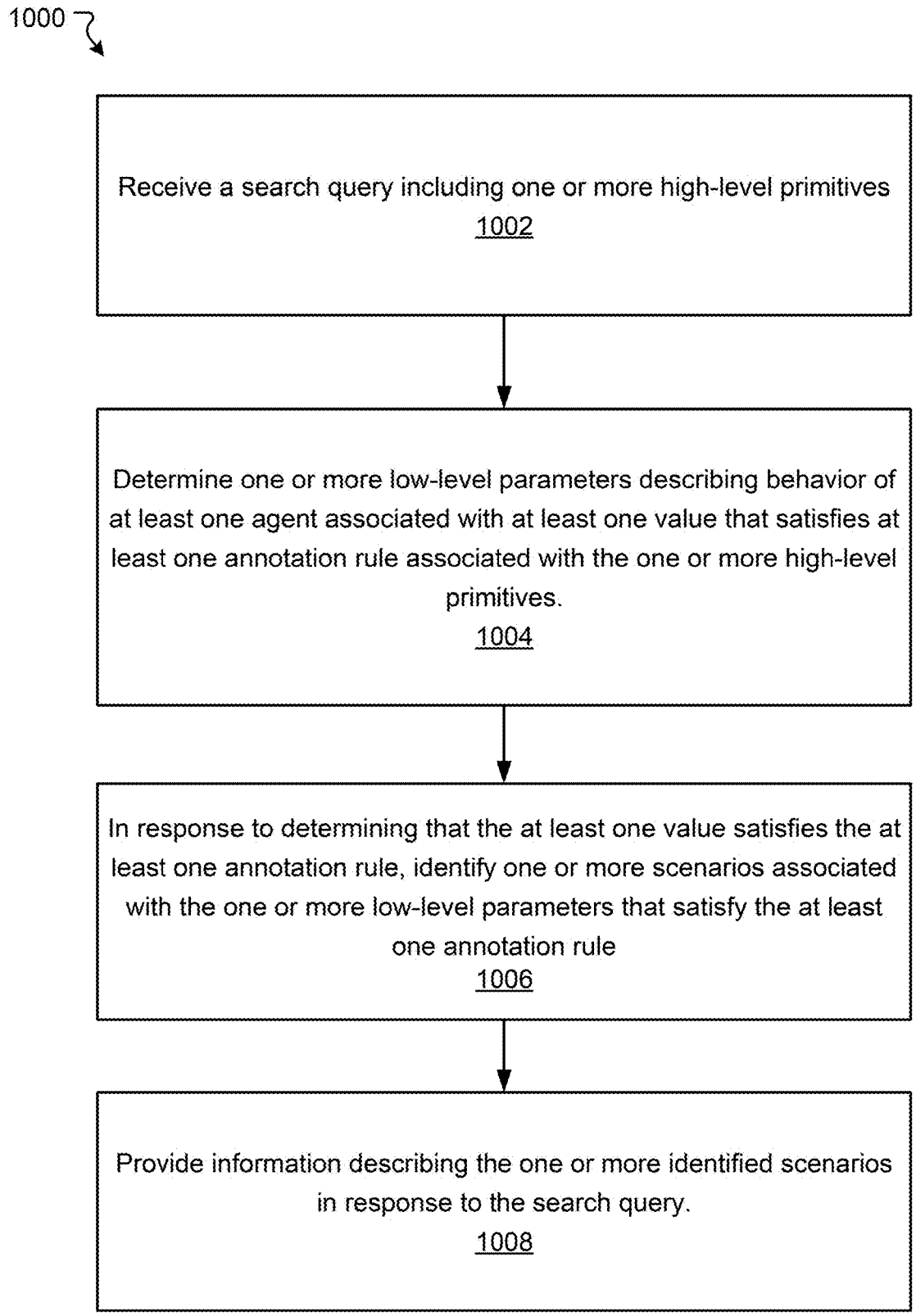
FIG. 10A-10C illustrate example methods, according to embodiments of the present technology.

FIG. 10A illustrates an example method 1000, according to an embodiment of the present technology. At block 1002, a search query including one or more high-level primitives can be received. At block 1004, one or more low-level parameters describing behavior of at least one agent associated with at least one value that satisfies at least one annotation rule associated with the one or more high-level primitives can be determined. At block 1006, in response to determining that the at least one value satisfies the at least one annotation rule, one or more scenarios associated with the one or more low-level parameters that satisfy the at least one annotation rule can be identified. At block 1008, information describing the one or more identified scenarios in response to the search query can be provided.

Figure 10B:
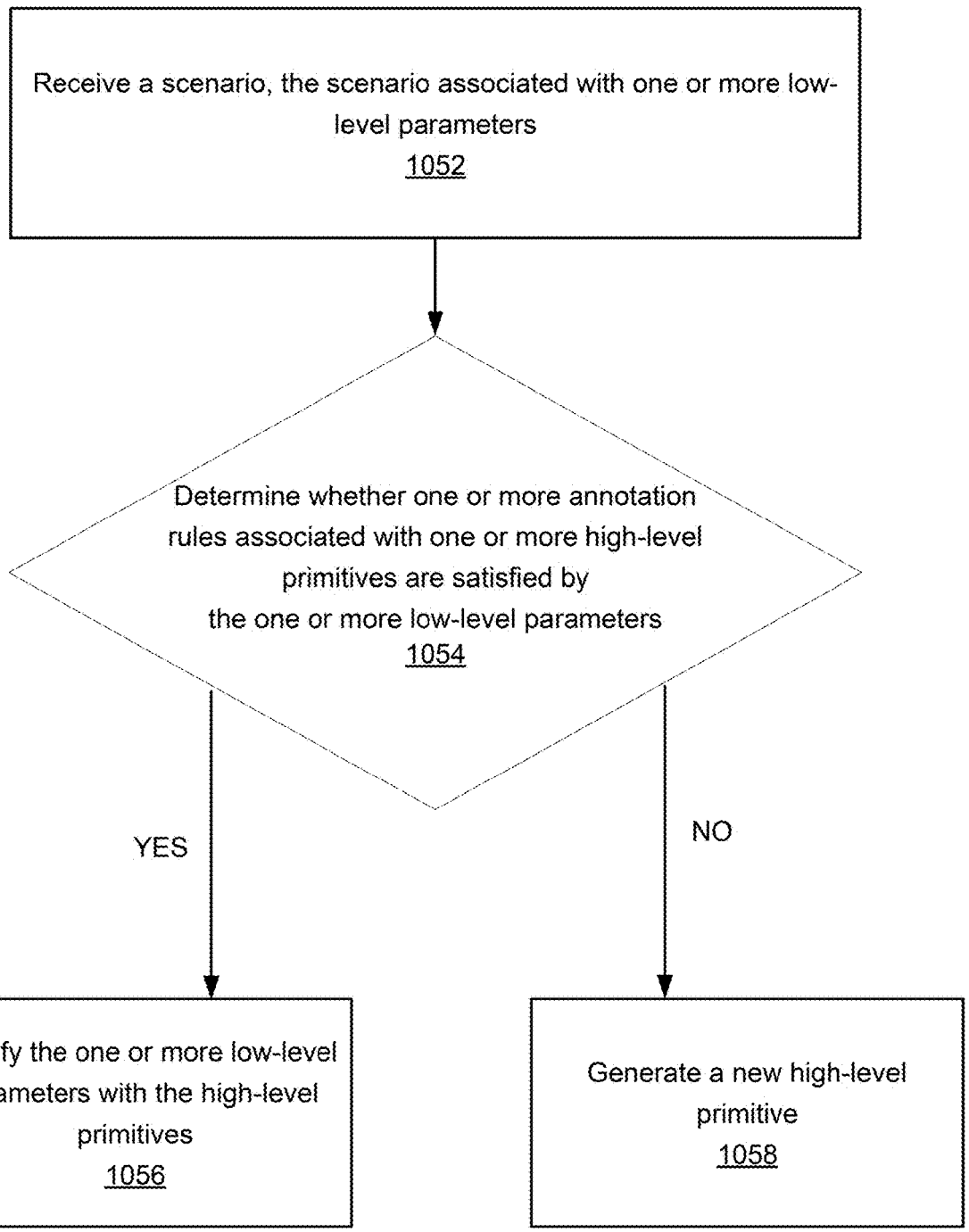

FIG. 10B illustrates an example method 1050, according to an embodiment of the present technology. At block 1052, a scenario associated with one or more low-level parameters is received. At block 1054, whether one or more annotation rules associated with one or more high-level primitives are satisfied is determined. At block 1056, in response to determining that the one or more annotation rules are satisfied, the one or more low-level parameters are identified with the one or more high-level primitives. At block 1058, in response to determining that the one or more annotation rules are not satisfied, a new high-level primitive is generated.

Figure 10C:
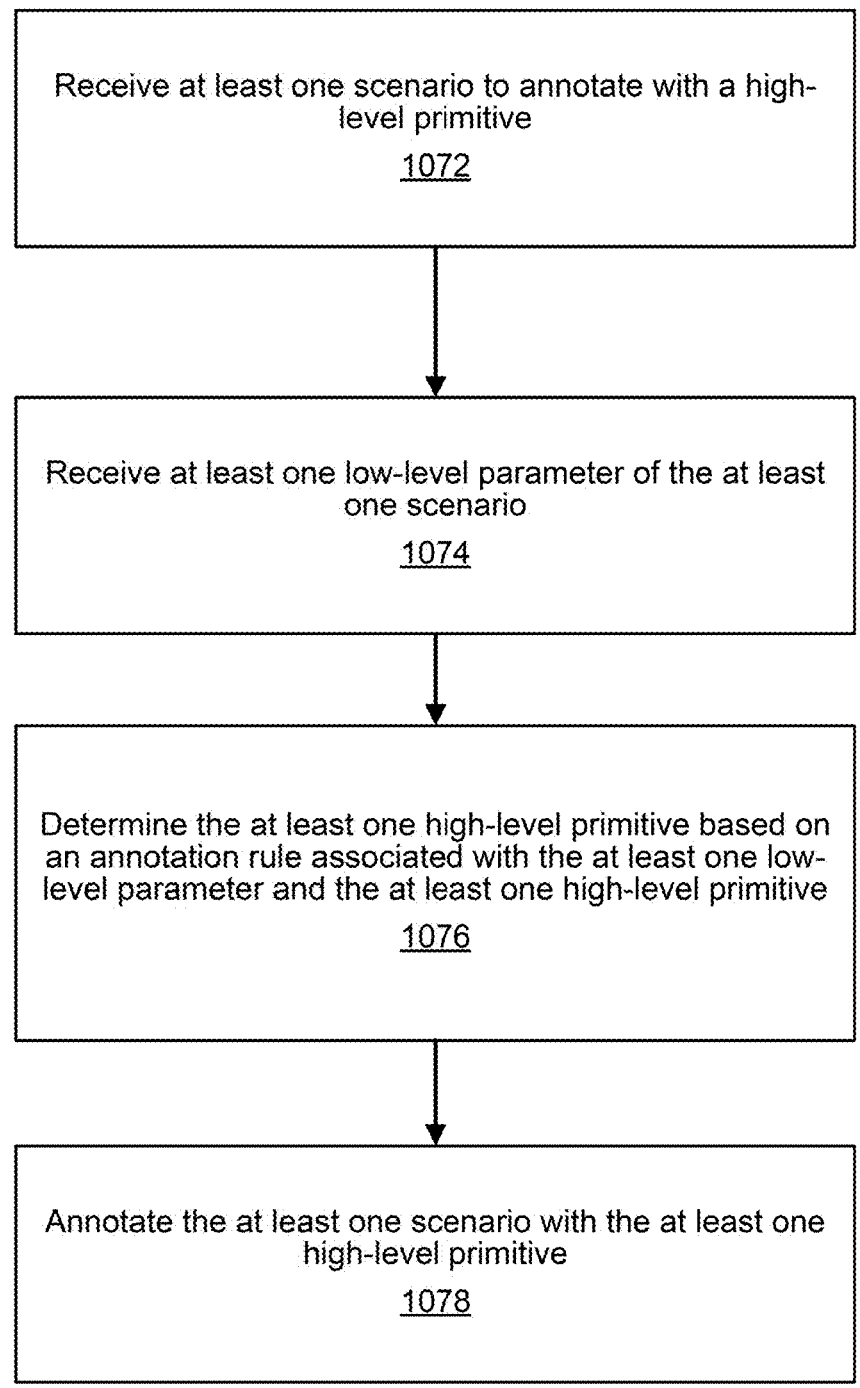

FIG. 10C illustrates an example method 1070, according to an embodiment of the present technology. At block 1072, at least one scenario to annotate with at least one high-level primitive is received. At block 1072, at least one low-level parameter of the at least one scenario is received. At block 1076, the at least one high-level primitive is determined based on an annotation rule associated with the at least one low-level parameter and the at least one high-level primitive. At block 1078, the at least one scenario is annotated with the at least one high-level primitive.

FIG. 11 illustrates an example block diagram of a transportation management environment for matching ride requestors with vehicles. In particular embodiments, the environment may include various computing entities, such as a user computing device 1130 of a user 1101 (e.g., a ride provider or requestor), a transportation management system 1160, a vehicle 1140, and one or more third-party systems 1170. The vehicle 1140 can be autonomous, semi-autonomous, or manually drivable. The computing entities may be communicatively connected over any suitable network 1110. As an example and not by way of limitation, one or more portions of network 1110 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 11 illustrates a single user device 1130, a single transportation management system 1160, a single vehicle 1140, a plurality of third-party systems 1170, and a single network 1110, this disclosure contemplates any suitable number of each of these entities. As an example and not by way of limitation, the network environment may include multiple users 1101, user devices 1130, transportation management systems 1160, vehicles 1140, third-party systems 1170, and networks 1110. In some embodiments, some or all modules of the scenario search module 202 may be implemented by one or more computing systems of the transportation management system 1160. In some embodiments, some or all modules of the scenario search module 202 may be implemented by one or more computing systems in the vehicle 1140.

The user device 1130, transportation management system 1160, vehicle 1140, and third-party system 1170 may be communicatively connected or co-located with each other in whole or in part. These computing entities may communicate via different transmission technologies and network types. For example, the user device 1130 and the vehicle 1140 may communicate with each other via a cable or short-range wireless communication (e.g., Bluetooth, NFC, WI-FI, etc.), and together they may be connected to the Internet via a cellular network that is accessible to either one of the devices (e.g., the user device 1130 may be a smartphone with LTE connection). The transportation management system 1160 and third-party system 1170, on the other hand, may be connected to the Internet via their respective LAN/WLAN networks and Internet Service Providers (ISP). FIG. 11 illustrates transmission links 1150 that connect user device 1130, vehicle 1140, transportation management system 1160, and third-party system 1170 to communication network 1110. This disclosure contemplates any suitable transmission links 1150, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1150 may connect to one or more networks 1110, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1150. For example, the user device 1130 may communicate with the transportation management system via a cellular network and the Internet, but communicate with the vehicle 1140 via Bluetooth or a physical wire connection.

In particular embodiments, the transportation management system 1160 may fulfill ride requests for one or more users 1101 by dispatching suitable vehicles. The transportation management system 1160 may receive any number of ride requests from any number of ride requestors 1101. In particular embodiments, a ride request from a ride requestor 1101 may include an identifier that identifies the ride requestor in the system 1160. The transportation management system 1160 may use the identifier to access and store the ride requestor's 1101 information, in accordance with the requestor's 1101 privacy settings. The ride requestor's 1101 information may be stored in one or more data stores (e.g., a relational database system) associated with and accessible to the transportation management system 1160. In particular embodiments, ride requestor information may include profile information about a particular ride requestor 1101. In particular embodiments, the ride requestor 1101 may be associated with one or more categories or types, through which the ride requestor 1101 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1160 may classify a user 1101 based on known information about the user 1101 (e.g., using machine-learning classifiers), and use the classification to retrieve relevant aggregate information associated with that class. For example, the system 1160 may classify a user 1101 as a young adult and retrieve relevant aggregate information associated with young adults, such as the type of music generally preferred by young adults.

Transportation management system 1160 may also store and access ride information. Ride information may include locations related to the ride, traffic data, route options, optimal pick-up or drop-off locations for the ride, or any other suitable information associated with a ride. As an example and not by way of limitation, when the transportation management system 1160 receives a request to travel from San Francisco International Airport (SFO) to Palo Alto, California, the system 1160 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1160. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 1160. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1160 in particular embodiments may predict and provide ride suggestions in response to a ride request. In particular embodiments, the system 1160 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 1160 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1160 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1130 (which may belong to a ride requestor or provider), a transportation management system 1160, vehicle system 1140, or a third-party system 1170 to process, transform, manage, retrieve, modify, add, or delete the information stored in the data store.

In particular embodiments, transportation management system 1160 may include an authorization server (or any other suitable component(s)) that allows users 1101 to opt-in to or opt-out of having their information and actions logged, recorded, or sensed by transportation management system 1160 or shared with other systems (e.g., third-party systems 1170). In particular embodiments, a user 1101 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1101 of transportation management system 1160 through blocking, data hashing, anonymization, or other suitable techniques as appropriate.

In particular embodiments, third-party system 1170 may be a network-addressable computing system that may provide HD maps or host GPS maps, customer reviews, music or content, weather information, or any other suitable type of information. Third-party system 1170 may generate, store, receive, and send relevant data, such as, for example, map data, customer review data from a customer review website, weather data, or any other suitable type of data. Third-party system 1170 may be accessed by the other computing entities of the network environment either directly or via network 1110. For example, user device 1130 may access the third-party system 1170 via network 1110, or via transportation management system 1160. In the latter case, if credentials are required to access the third-party system 1170, the user 1101 may provide such information to the transportation management system 1160, which may serve as a proxy for accessing content from the third-party system 1170.

In particular embodiments, user device 1130 may be a mobile computing device such as a smartphone, tablet computer, or laptop computer. User device 1130 may include one or more processors (e.g., CPU, GPU), memory, and storage. An operating system and applications may be installed on the user device 1130, such as, e.g., a transportation application associated with the transportation management system 1160, applications associated with third-party systems 1170, and applications associated with the operating system. User device 1130 may include functionality for determining its location, direction, or orientation, based on integrated sensors such as GPS, compass, gyroscope, or accelerometer. User device 1130 may also include wireless transceivers for wireless communication and may support wireless communication protocols such as Bluetooth, near-field communication (NFC), infrared (IR) communication, WI-FI, and 2G/3G/4G/LTE mobile communication standard. User device 1130 may also include one or more cameras, scanners, touchscreens, microphones, speakers, and any other suitable input-output devices.

In particular embodiments, the vehicle 1140 may be equipped with an array of sensors 1144, a navigation system 1146, and a ride-service computing device 1148. In particular embodiments, a fleet of vehicles 1140 may be managed by the transportation management system 1160. The fleet of vehicles 1140, in whole or in part, may be owned by the entity associated with the transportation management system 1160, or they may be owned by a third-party entity relative to the transportation management system 1160. In either case, the transportation management system 1160 may control the operations of the vehicles 1140, including, e.g., dispatching select vehicles 1140 to fulfill ride requests, instructing the vehicles 1140 to perform select operations (e.g., head to a service center or charging/fueling station, pull over, stop immediately, self-diagnose, lock/unlock compartments, change music station, change temperature, and any other suitable operations), and instructing the vehicles 1140 to enter select operation modes (e.g., operate normally, drive at a reduced speed, drive under the command of human operators, and any other suitable operational modes).

In particular embodiments, the vehicles 1140 may receive data from and transmit data to the transportation management system 1160 and the third-party system 1170. Examples of received data may include, e.g., instructions, new software or software updates, maps, 3D models, trained or untrained machine-learning models, location information (e.g., location of the ride requestor, the vehicle 1140 itself, other vehicles 1140, and target destinations such as service centers), navigation information, traffic information, weather information, entertainment content (e.g., music, video, and news) ride requestor information, ride information, and any other suitable information. Examples of data transmitted from the vehicle 1140 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1140, passengers may send/receive data to the transportation management system 1160 and third-party system 1170), and any other suitable data.

In particular embodiments, vehicles 1140 may also communicate with each other, including those managed and not managed by the transportation management system 1160. For example, one vehicle 1140 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 1160 or third-party system 1170), or both.

In particular embodiments, a vehicle 1140 may obtain and process sensor/telemetry data. Such data may be captured by any suitable sensors. For example, the vehicle 1140 may have a Light Detection and Ranging (LiDAR) sensor array of multiple LiDAR transceivers that are configured to rotate 360°, emitting pulsed laser light and measuring the reflected light from objects surrounding vehicle 1140. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LIDAR is an effective sensor for measuring distances to targets, and as such may be used to generate a three-dimensional (3D) model of the external environment of the vehicle 1140. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 1140 may have optical cameras pointing in different directions. The cameras may be used for, e.g., recognizing roads, lane markings, street signs, traffic lights, police, other vehicles, and any other visible objects of interest. To enable the vehicle 1140 to "see" at night, infrared cameras may be installed. In particular embodiments, the vehicle may be equipped with stereo vision for, e.g., spotting hazards such as pedestrians or tree branches on the road. As another example, the vehicle 1140 may have radars for, e.g., detecting other vehicles and hazards afar. Furthermore, the vehicle 1140 may have ultrasound equipment for, e.g., parking and agent detection. In addition to sensors enabling the vehicle 1140 to detect, measure, and understand the external world around it, the vehicle 1140 may further be equipped with sensors for detecting and self-diagnosing the vehicle's own state and condition. For example, the vehicle 1140 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 1140 may build a 3D model of its surrounding based on data from its LiDAR, radar, sonar, and cameras, along with a pre-generated map obtained from the transportation management system 1160 or the third-party system 1170. Although sensors 1144 appear in a particular location on the vehicle 1140 in FIG. 11, sensors 1144 may be located in any suitable location in or on the vehicle 1140. Example locations for sensors include the front and rear bumpers, the doors, the front windshield, on the side panel, or any other suitable location.

In particular embodiments, the vehicle 1140 may be equipped with a processing unit (e.g., one or more CPUs and GPUs), memory, and storage. The vehicle 1140 may thus be equipped to perform a variety of computational and processing tasks, including processing the sensor data, extracting useful information, and operating accordingly. For example, based on images captured by its cameras and a machine-vision model, the vehicle 1140 may identify particular types of objects captured by the images, such as pedestrians, other vehicles, lanes, curbs, and any other objects of interest.

In particular embodiments, the vehicle 1140 may have a navigation system 1146 responsible for safely navigating the vehicle 1140. In particular embodiments, the navigation system 1146 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1146 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1146 may use its determinations to control the vehicle 1140 to operate in prescribed manners and to guide the vehicle 1140 to its destinations without colliding into other objects. Although the physical embodiment of the navigation system 1146 (e.g., the processing unit) appears in a particular location on the vehicle 1140 in FIG. 11, navigation system 1146 may be located in any suitable location in or on the vehicle 1140. Example locations for navigation system 1146 include inside the cabin or passenger compartment of the vehicle 1140, near the engine/battery, near the front seats, rear seats, or in any other suitable location.

In particular embodiments, the vehicle 1140 may be equipped with a ride-service computing device 1148, which may be a tablet or any other suitable device installed by transportation management system 1160 to allow the user to interact with the vehicle 1140, transportation management system 1160, other users 1101, or third-party systems 1170. In particular embodiments, installation of ride-service computing device 1148 may be accomplished by placing the ride-service computing device 1148 inside the vehicle 1140, and configuring it to communicate with the vehicle 1140 via a wired or wireless connection (e.g., via Bluetooth). Although FIG. 11 illustrates a single ride-service computing device 1148 at a particular location in the vehicle 1140, the vehicle 1140 may include several ride-service computing devices 1148 in several different locations within the vehicle. As an example and not by way of limitation, the vehicle 1140 may include four ride-service computing devices 1148 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1148 may be detachable from any component of the vehicle 1140. This may allow users to handle ride-service computing device 1148 in a manner consistent with other tablet computing devices. As an example and not by way of limitation, a user may move ride-service computing device 1148 to any location in the cabin or passenger compartment of the vehicle 1140, may hold ride-service computing device 1148, or handle ride-service computing device 1148 in any other suitable manner. Although this disclosure describes providing a particular computing device in a particular manner, this disclosure contemplates providing any suitable computing device in any suitable manner.

Figure 12:
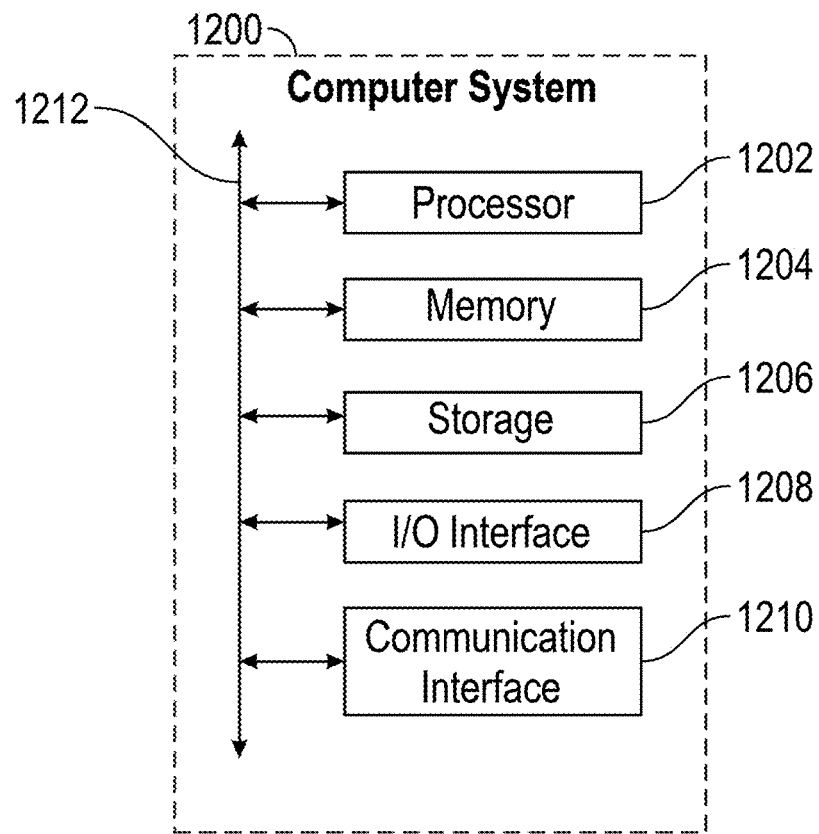
FIG. 12 illustrates an example of a computer system or computing device that can be utilized in various scenarios, according to an embodiment of the present technology.

FIG. 12 illustrates an example computer system 1200. In particular embodiments, one or more computer systems 1200 perform one or more steps of one or more methods described or illustrated herein. In particular embodiments, one or more computer systems 1200 provide the functionalities described or illustrated herein. In particular embodiments, software running on one or more computer systems 1200 performs one or more steps of one or more methods described or illustrated herein or provides the functionalities described or illustrated herein. Particular embodiments include one or more portions of one or more computer systems 1200. Herein, a reference to a computer system may encompass a computing device, and vice versa, where appropriate. Moreover, a reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 that are to be operated on by computer instructions; the results of previous instructions executed by processor 1202 that are accessible to subsequent instructions or for writing to memory 1204 or storage 1206; or any other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs), be a multi-core processor, or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described in further detail below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware or software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware or software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware or software, or both coupling components of computer system 1200 to each other. As an example and not by way of limitation, bus 1212 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
   determining, by a computing device, a scenario based on data captured by at least one sensor of a vehicle while navigating an environment over a period of time;
   encoding, by the computing device, the scenario to obtain an encoded scenario;
   inputting, by the computing device, the encoded scenario into a machine learning model trained to associate the encoded scenario with a corresponding embedding in vector space, wherein the machine learning model is trained with an anchor scenario, a positive representation of a scenario that has a threshold level of similarity to the anchor scenario, and a negative representation of a scenario that does not have the threshold level of similarity to the anchor scenario, and embeddings of the anchor scenario and the positive representation are located closer in the vector space than embeddings of the anchor scenario and the negative representation;
   obtaining, by the computing device, the embedding of the encoded scenario in the vector space output by the machine learning model; and
   using, by the computing device, the embedding to represent the scenario in embedding-based scenario searches.

2. The computer-implemented method of claim 1, wherein
   the encoding the scenario into the encoded scenario comprises:
   encoding semantic map information with pixels of different colors, wherein the semantic map information includes a first direction and a second direction of travel of a road, and the first direction from a first point to a second point is encoded with a first color, and the second direction from the second point to the first point is encoded with a second color different from the first color.

3. The computer-implemented method of claim 1, wherein the scenario comprises one or more agents, and the encoding the scenario to obtain the encoded scenario comprises:
   encoding movements of the one or more agents over time with pixels of different colors, wherein the pixels of different colors are used to indicate respective velocity and trajectories of the one or more agents.

4. The computer-implemented method of claim 1, wherein pixels in the encoded scenario capture temporal information using graded colors or contrasts to facilitate scenario searches with temporal aspects.

5. The computer-implemented method of claim 1, wherein the embedding-based scenario searches are based on:
   determining a similarity between two scenarios based on a distance between the embeddings of the two scenarios.

6. The computer-implemented method of claim 1, wherein the machine learning model is trained by:
   encoding the anchor scenario into an anchor encoded image;
   encoding the positive representation into a positive encoded image;
   encoding the negative representation into a negative encoded image;
   generating embeddings for each of the anchor encoded image, positive encoded image, and negative encoded image, wherein the embeddings are vector representations; and
   training the machine learning model such that a distance between the embedding of the anchor encoded image and the embedding of the positive encoded image is smaller than a distance between the embedding of the anchor encoded image and the embedding of the negative encoded image.

7. The computer-implemented method of claim 1, further comprising:
   selecting the positive representation and the negative representation based on a taxonomy, wherein the positive representation is selected from the same category as the anchor scenario and the negative representation is selected from a different category.

8. The computer-implemented method of claim 6, further comprising:
arranging the anchor encoded image representing the scenario within the vector space that includes the positive encoded image and the negative encoded image, wherein a first threshold distance between the anchor encoded image and the positive encoded image within the vector space is less than a second threshold distance between the anchor encoded image and the negative encoded image within the vector space.

9. The computer-implemented method of claim 1, wherein the machine learning model is a neural network.

10. The computer-implemented method of claim 1, wherein the scenario is based on multiple images that are captured by the at least one sensor of the vehicle over a period of time, and the encoded scenario comprises:
at least one trajectory associated with one or more agents; and
map data.

11. A system comprising:
at least one processor; and
a memory storing instructions that, when executed by the at least one processor, cause the system to perform operations comprising:
determining a scenario based on data captured by at least one sensor of a vehicle while navigating an environment over a period of time;
encoding the scenario into an encoded scenario;
inputting the encoded scenario into a machine learning model trained to associate the encoded scenario with a corresponding embedding in vector space, wherein the machine learning model is trained with an anchor scenario, a positive representation of a scenario that has a threshold level of similarity to the anchor scenario, and a negative representation of a scenario that does not have the threshold level of similarity to the anchor scenario, and embeddings of the anchor scenario and the positive representation are located closer in the vector space than embeddings of the anchor scenario and the negative representation;
obtaining the embedding of the encoded scenario in the vector space output by the machine learning model; and
using the embedding to represent the scenario in embedding-based scenario searches.

12. The system of claim 11, wherein
the encoding the scenario into the encoded scenario comprises:
encoding semantic map information with pixels of different colors, wherein the semantic map information includes a first direction and a second direction of travel of a road, and the first direction from a first point to a second point is encoded with a first color, and the second direction from the second point to the first point is encoded with a second color different from the first color.

13. The system of claim 11, wherein the scenario comprises one or more agents, and the encoding the scenario to obtain the encoded scenario comprises:
encoding movements of the one or more agents over time with pixels of different colors, wherein the pixels of different colors are used to indicate respective velocity and trajectories of the one or more agents.

14. The system of claim 11, wherein the embedding-based scenario searches are based on:
determining a similarity between two scenarios based on a distance between the embeddings of the two scenarios.

15. The system of claim 11, the operations further comprising:
encoding the anchor scenario into an anchor encoded image;
encoding the positive representation into a positive encoded image;
encoding the negative representation into a negative encoded image;
generating embeddings for each of the anchor encoded image, positive encoded image, and negative encoded image, wherein the embeddings are vector representations; and
training the machine learning model such that a distance between the embedding of the anchor encoded image and the embedding of the positive encoded image is smaller than a distance between the embedding of the anchor encoded image and the embedding of the negative encoded image.

16. The system of claim 11, wherein the operations further comprise:
selecting the positive representation and the negative representation based on a taxonomy, wherein the positive representation is selected from the same category as the anchor scenario and the negative representation is selected from a different category.

17. A non-transitory computer-readable storage medium including instructions that, when executed by at least one processor of a computing system, cause the computing system to perform operations comprising:
determining a scenario based on data captured by at least one sensor of a vehicle while navigating an environment over a period of time;
encoding the scenario into an encoded scenario;
inputting the encoded scenario into a machine learning model trained to associate the encoded scenario with a corresponding embedding in vector space, wherein the machine learning model is trained with an anchor scenario, a positive representation of a scenario that has a threshold level of similarity to the anchor scenario, and a negative representation of a scenario that does not have the threshold level of similarity to the anchor scenario, and embeddings of the anchor scenario and the positive representation are located closer in the vector space than embeddings of the anchor scenario and the negative representation;
obtaining the embedding of the encoded scenario in the vector space output by the machine learning model; and
using the embedding to represent the scenario in embedding-based scenario searches.

18. The non-transitory computer-readable storage medium of claim 17, wherein
the encoding the scenario into the encoded scenario comprises:
encoding semantic map information with pixels of different colors, wherein the semantic map information includes a first direction and a second direction of travel of a road, and the first direction from a first point to a second point is encoded with a first color, and the second direction from the second point to the first point is encoded with a second color different from the first color.

19. The non-transitory computer-readable storage medium of claim 17, wherein the scenario comprises one or more agents, and the encoding the scenario to obtain the encoded scenario comprises:
- encoding movements of the one or more agents over time with pixels of different colors, wherein the pixels of different colors are used to indicate respective velocity and trajectories of the one or more agents.

20. The non-transitory computer-readable storage medium of claim 17, wherein the operations further comprise:
- encoding the anchor scenario into an anchor encoded image;
- encoding the positive representation into a positive encoded image;
- encoding the negative representation into a negative encoded image;
- generating embeddings for each of the anchor encoded image, positive encoded image, and negative encoded image, wherein the embeddings are vector representations; and
- training the machine learning model such that a distance between the embedding of the anchor encoded image and the embedding of the positive encoded image is smaller than a distance between the embedding of the anchor encoded image and the embedding of the negative encoded image.

* * * * *